US008315480B2

(12) United States Patent
Matsuzaki

(10) Patent No.: US 8,315,480 B2
(45) Date of Patent: Nov. 20, 2012

(54) IMAGE PROCESSING APPARATUS, IMAGE PROCESSING METHOD, AND PROGRAM TO EXECUTE THE IMAGE PROCESSING METHOD

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 12/340,331

(22) Filed: Dec. 19, 2008

(65) Prior Publication Data

US 2009/0168128 A1 Jul. 2, 2009

(30) Foreign Application Priority Data

Dec. 28, 2007 (JP) ................................ 2007-340389
Dec. 16, 2008 (JP) ................................ 2008-320304

(51) Int. Cl.
*G06K 9/32* (2006.01)

(52) U.S. Cl. ...................................................... 382/299

(58) Field of Classification Search ............. 348/208.13, 348/333.11, E13.017, E11.013; 382/299
See application file for complete search history.

(56) References Cited

U.S. PATENT DOCUMENTS

| 2007/0146511 | A1* | 6/2007 | Kinoshita et al. | ............. | 348/272 |
| 2008/0131028 | A1* | 6/2008 | Pillman et al. | ................ | 382/299 |
| 2009/0161169 | A1 | 6/2009 | Muramatsu | | |

FOREIGN PATENT DOCUMENTS

| CN | 1968423 A | 5/2007 |
| JP | 03-099574 A | 4/1991 |
| JP | 05-260263 A | 10/1993 |
| JP | 2006-092450 A | 4/2006 |

OTHER PUBLICATIONS

Aoki, Shin. "Super Resolution Processing by Plural Number of Lower Resolution Images". Ricoh Technical Report No. 24, Nov. 1998, pp. 19-25.
Translation into the English Language of "Notification of First Office Action" and "The First Office Action" from the State Intellectual Property Office of the People's Republic of China in Patent Application No. 200810186442.4 Serial Issue No. 2010070900299120 bearing the Date of Issuing of Jul. 14, 2010.

* cited by examiner

*Primary Examiner* — Gregory F Cunningham
(74) *Attorney, Agent, or Firm* — Canon USA, Inc., IP Division

(57) ABSTRACT

An image processing apparatus includes a sensor unit configured to include a plurality of line sensors to read image data having a plurality of channels; a correcting unit configured to correct the image data read by the sensor unit to obtain a plurality of frames of image data in which reading positions on an original image by adjacent line sensors among the plurality of line sensors are shifted by less than a pixel in a main scanning direction or/and a sub-scanning direction; and a high-resolution converting unit configured to perform interpolation by using the plurality of frames of image data obtained by the correcting unit so as to obtain monochrome image data having resolution higher than resolution of the line sensors.

23 Claims, 17 Drawing Sheets

(A) MAIN SCANNING DIRECTION (B) SUB-SCANNING DIRECTION

◇ PIXEL OF TARGET LOW-RESOLUTION IMAGE

● TARGET PIXEL OF SUPER RESOLUTION PROCESSING

IMAGE PROCESSING APPARATUS, IMAGE PROCESSING METHOD, AND PROGRAM TO EXECUTE THE IMAGE PROCESSING METHOD

BACKGROUND OF THE INVENTION

1. Field of the Invention

The present invention relates to an image processing apparatus and an image processing method using a scanner, and a program to execute the image processing method.

2. Description of the Related Art

There exists a technique of "super resolution processing" and "super resolution conversion" to increase resolution by using a plurality of pieces of image data of certain resolution. The technique enables conversion of a low-resolution image to a high-resolution image, so that a high-resolution image can be obtained in a conventional device ("Super Resolution Processing by Plural Number of Lower Resolution Images" Ricoh Technical Report No. 24, November, 1998).

The super resolution technique is widely applied in a field of moving image processing and the like because execution of the super resolution technique requires a plurality of frames of image data in which reading positions on an original image are slightly different in units of sub-pixels (a unit smaller than a pixel).

In the super resolution processing, however, a plurality of frames of image data are necessary to generate image data of one pixel of a high-resolution image, which causes a problem of a large amount of data and calculation.

Conventionally, the amount of calculation has been reduced by determining the number of pieces of image data on which super resolution processing is performed, in accordance with the size of a target image area (Japanese Patent Laid-Open No. 2006-092450).

However, line sensors are typically used as a reading device in an image processing apparatus, such as an MFP (Multifunction peripheral) or a scanner. That is, one reading operation can read data of one page.

The above-described reading device reads an original image by using a group of pixel sensors that are horizontally placed in a main scanning direction at intervals of an integral multiple of a pixel. Thus, the reading device is disadvantageously incapable of reading the original image by slightly shifting the reading position of pixels in units of sub-pixels in the main scanning direction.

Under the above-described circumstances, it is difficult to perform super resolution processing in an MFP. The performance of a device needs to be enhanced in order to obtain high-resolution images, which results in high cost.

In recent years, an MFP including a color scanner and a monochrome printer has become widespread, enabling transmission of color information. However, the printer unit therein can accept only monochrome data and thus the color information obtained through the color scanner is lost in a copy operation, so that an advantage of the color information is not fully utilized.

SUMMARY OF THE INVENTION

To address the above-described problems, an image processing apparatus according to an embodiment of the present invention includes a sensor unit configured to include a plurality of line sensors to read image data having a plurality of channels; a correcting unit configured to correct the image data read by the sensor unit to obtain a plurality of frames of image data in which reading positions on an original image by adjacent line sensors among the plurality of line sensors are shifted by less than a pixel in at least one of a main scanning direction and a sub-scanning direction; and a high-resolution converting unit configured to perform interpolation by using the plurality of frames of image data obtained by the correcting unit so as to obtain monochrome image data having resolution higher than resolution of the line sensors.

With the above-described configuration, super resolution processing is performed by obtaining a plurality of frames of image data in which reading positions on an original image are different. By applying super resolution processing in accordance with the present invention, a high-resolution image can be obtained using a scanner whose mechanical configuration doesn't need to be much more complex than that of a conventional scanner.

Further features of the present invention will become apparent from the following description of exemplary embodiments with reference to the attached drawings.

DESCRIPTION OF THE EMBODIMENTS

A first embodiment of the present invention is described next. In this embodiment, a description is given about a method for obtaining a plurality of frames of image data in which reading positions on an original image are slightly different and generating a high-resolution image for an achromatic portion in an MFP (Multifunction Peripheral) including a color scanner and a monochrome printer. This embodiment can be applied to monochrome printing performed in an MFP including a color scanner and a color printer.

Figure 1:
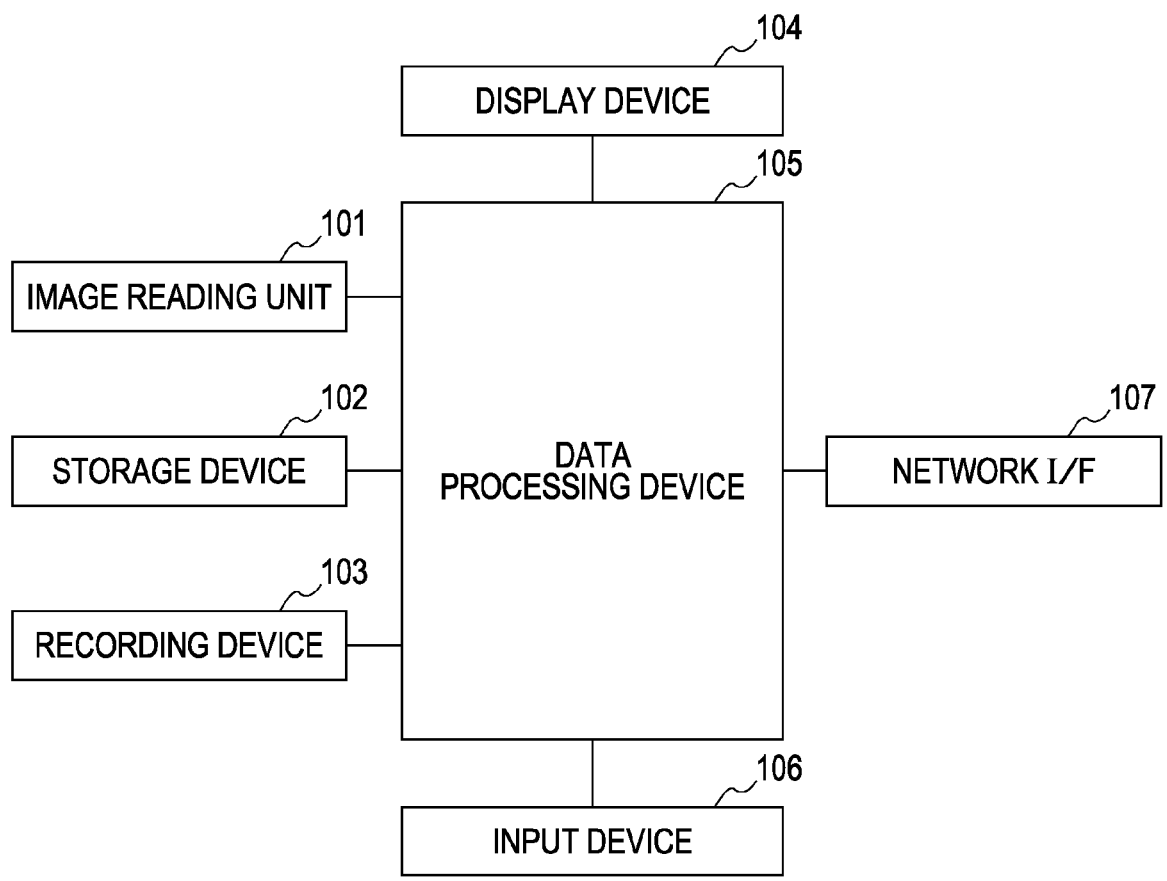
FIG. 1 illustrates a configuration of an MFP according to embodiments of the present invention.

FIG. 1 illustrates a configuration of an MFP. An image reading unit 101 is a scanner including an auto document feeder. In the image reading unit 101, a light source (not illustrated) irradiates a batch of original images or an original image, an image reflected from the original image is formed by a lens on a solid-state image pickup element, such as a CCD (Charge Coupled Device) sensor, so that raster image read signals from the solid-state image pickup element are obtained as image information.

In an MFP including a color scanner, RGB color images are obtained by attaching three types of color filters to a solid-state image pickup element.

A recording device 103 is a printer. When a copy function of the MFP is executed, image signals are processed into recording signals by a data processing device 105, and the recording signals are sequentially output to the recording device 103, whereby an image is formed on paper. At this time, the data processing device 105 converts RGB data received from the image reading unit 101 to monochrome data. The recording device 103 performs image forming on the data processed by the data processing device 105 by using a black coloring material and outputs the image.

Instructions from an operator to the MFP are provided through an input device 106, which is a key operation unit provided in the MFP. Those series of operations are controlled by a control unit (not illustrated) in the data processing device 105.

On the other hand, an operation input status and image data that is being processed are displayed in a display device 104.

A storage device 102 is an area capable of storing image data and the like read by the image reading unit 101.

A network I/F 107 is an interface to connect to a network. By using the network I/F 107, image data can be received from a PC (Personal Computer) or the like, the image data can be processed by the data processing device 105, and the image data can be output by the recording device 103.

Also, data read by the image reading unit 101 and processed by the data processing device 105 can be transmitted to a PC or the like via the network I/F 107. When such a process is performed, unlike in a copy process, RGB data obtained from the image reading unit 101 can be transmitted as color data after image processing has been performed thereon.

Figure 13A:
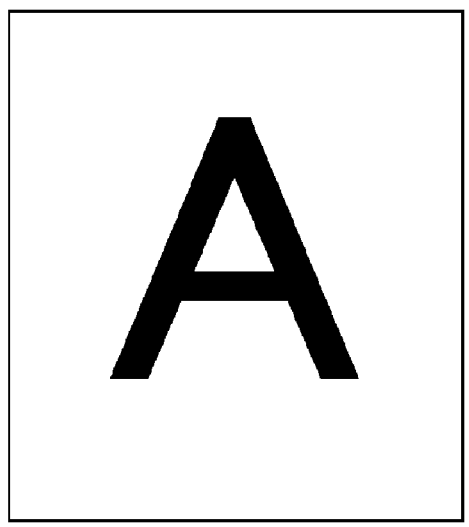
FIGS. 13A to 13C illustrate examples of super resolution processing in accordance with the present invention.
Figure 13B:
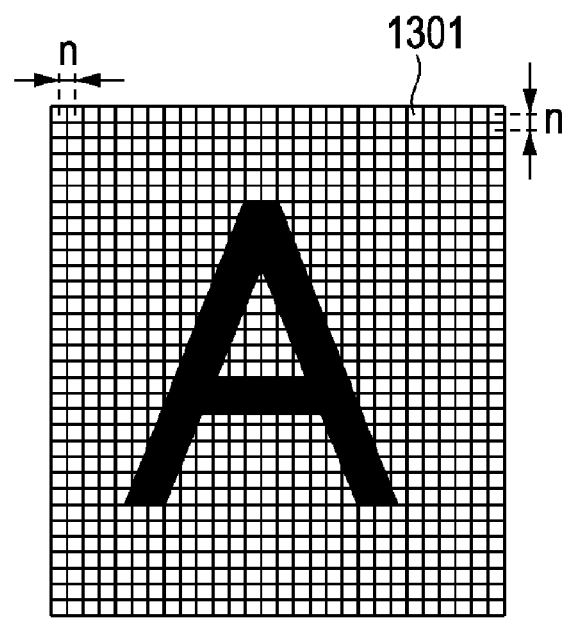

A super resolution technique is described below. FIG. 13A illustrates an image to be read by a reading device. FIG. 13B illustrates a pixel configuration in the case where the image is read at resolution of 1200 dpi, for example. In FIG. 13B, a grid pattern 1301 indicates pixel data constituted at reading resolution. That is, a distance "n" as a pixel pitch corresponds to a distance of a pixel sensor constituting a line sensor when the reading resolution is 1200 dpi.

Figure 13C:
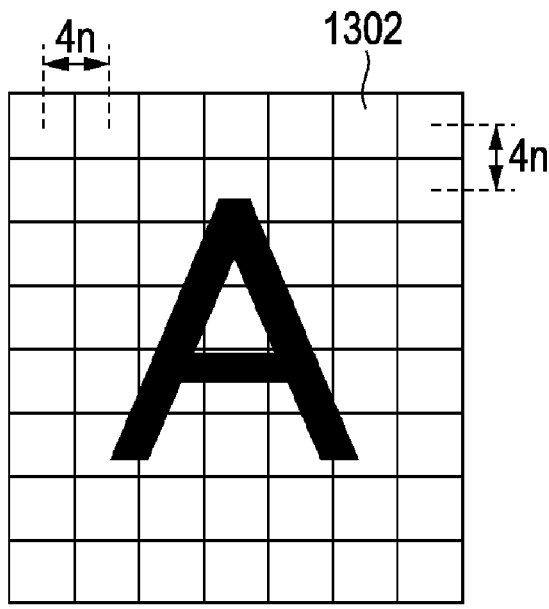

FIG. 13C illustrates a pixel configuration in the case where the reading device reads an image of the same image size at resolution of 300 dpi. As in FIG. 13B, a grid pattern 1302 indicates pixel data constituted at reading resolution. Thus, compared to the distance "n" as a pixel pitch in 1200 dpi, the distance as a pixel pitch in 300 dpi is longer, that is, 4n.

Since the reproducibility of a read image is proportional to the resolution, a difference in image quality is significant between the image read at 1200 dpi (FIG. 13B) and the image read at 300 dpi (FIG. 13C).

Super resolution processing is a technique of generating the image illustrated in FIG. 13B from a plurality of pieces of image data each corresponding to the image illustrated in FIG. 13C. By using this technique, an image equivalent to that read by a high-resolution device can be generated even if the resolution of a reading device is not so high.

Preferably, certain conditions are satisfied to perform "super resolution conversion" for obtaining a high-resolution image or a higher-resolution image from low-resolution image data. The conditions are as follows. First, a plurality of frames of image data of an original image are preferably available, reading positions of the plurality of frames being slightly shifted in a main scanning direction and/or a sub-scanning direction based on image data of the original image read at resolution of sensors of the reading device. In other words, a plurality of sequential frames of image data are used, the sequential frames being generated by slightly shifting the reading position on the original image read by the sensors in the main scanning direction and/or the sub-scanning direction based on reference image data.

In addition, when the plurality of frames of image data are read, a shift in reading position on the original image between frames obtained by adjacent sensors preferably is smaller than one pixel (sub-pixel) in the main scanning direction and/or the sub-scanning direction. The shift in reading position may be a shift smaller than one pixel that remains as a result of offset correction performed on a shift of integral multiple.

Hereinafter, the data that is read by scanning an original image constituted by one frame, that is, the data constituting or representing one frame of the original image, is called "frame image data". Frame image data can also refer to data obtained by processing a scanned frame of image data, for example, using an affine or other transformation(s) and/or channel division.

The position of a pixel read in an original image is called a "phase". When the phase shifts, it is called "the phase shifts", and a shift of a read pixel is called a "phase shift". The low resolution used here is not limited to 300 dpi but means the resolution of an image output from the device in normal printing.

The main scanning direction used here is the direction vertical to the direction in which a light source moves with respect to an original image when the scanner reads the original image placed on a platen. As indicated by an arrow (A) in FIG. 3, the horizontal direction of the read original image is called a "main scanning direction". On the other hand, the sub-scanning direction is the direction parallel to the moving direction of the light source. As indicated by an arrow (B) in FIG. 3, the vertical direction of the read original image is called a "sub-scanning direction".

Alternatively, conversion to higher resolution can be performed based on a phase shift only in the main scanning direction or a phase shift only in the sub-scanning direction. In this case, however, higher resolution is achieved only in the direction having a phase shift.

Figure 14A:
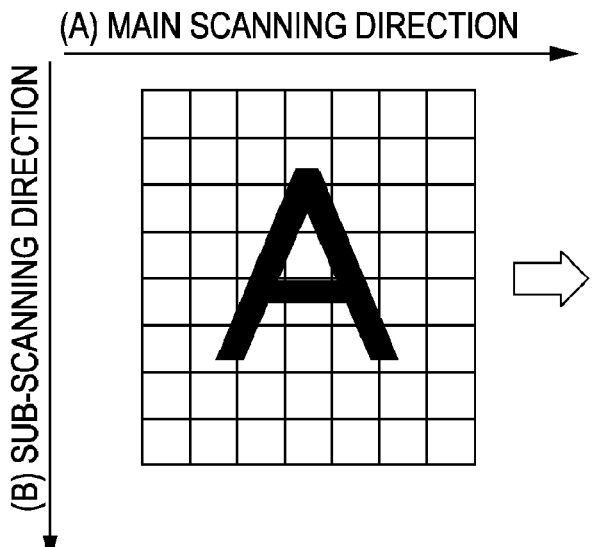
FIGS. 14A to 14F illustrate examples of super resolution processing in accordance with the present invention.
Figure 14B:
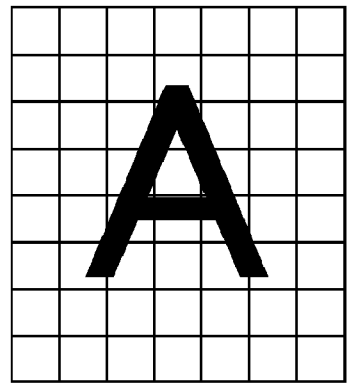

Below, a description is given about conditions for the super resolution processing with reference to FIG. 14A and so on. FIG. 14A illustrates a pixel configuration in the case where the original image illustrated in FIG. 13A is read at resolution of 300 dpi. As in FIG. 3, the direction indicated by an arrow (A) is the main scanning direction, whereas the direction indicated by an arrow (B) is the sub-scanning direction. This figure is the same as the original image illustrated in FIG. 13A. A read image illustrated in FIG. 14B serves as first-frame target image data on which super resolution processing is to be performed and servers as reference image data.

Figure 14C:
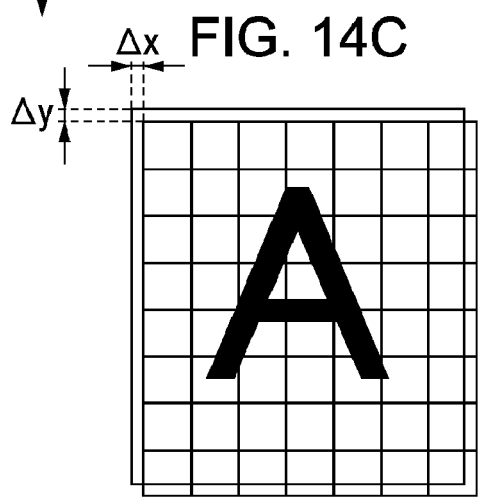
Figure 14D:
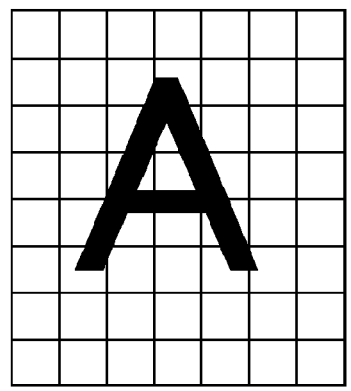

Then, as illustrated in FIG. 14C, the original image illustrated in FIG. 13A is read at resolution of 300 dpi with a phase shift of $\Delta x$ ($\Delta x < 4n$) in the main scanning direction and $\Delta y$ ($\Delta y < 4n$) in the sub-scanning direction based on the reference image data. In this case, the phase of read image data illustrated in FIG. 14D is different from that of the original image, that is, the phase is shifted by Δx to the left in the main scanning direction and Δy upward in the sub-scanning direction in the figure. The read image data illustrated in FIG. 14D serves as second-frame target image data on which super resolution processing is to be performed.

Figure 14E:
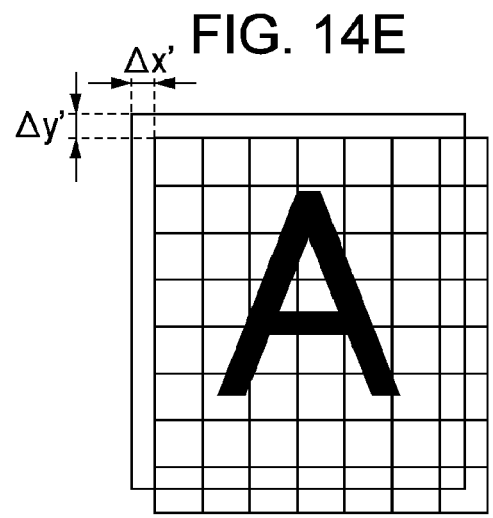
Figure 14F:
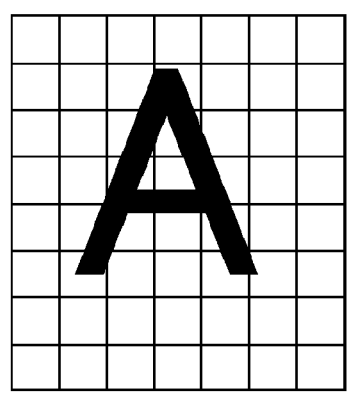

Furthermore, as illustrated in FIG. 14E, the original image illustrated in FIG. 13A is read at resolution of 300 dpi with a phase shift of Δx' (Δx'<4n, Δx<Δx') in the main scanning direction and Δy' (Δy'<4n, Δy<Δy') in the sub-scanning direction based on the reference image data. In this case, the phase of read image data illustrated in FIG. 14F is different from that of the original image, that is, the phase is shifted by Δx' to the left in the main scanning direction and Δy' upward in the sub-scanning direction in the figure. The read image data illustrated in FIG. 14F serves as third-frame target image data on which super resolution processing is to be performed.

After such a plurality of frames of low-resolution image data having different phases with respect to the reference image have been obtained, conversion to higher resolution can be performed through super resolution processing.

Figure 15:
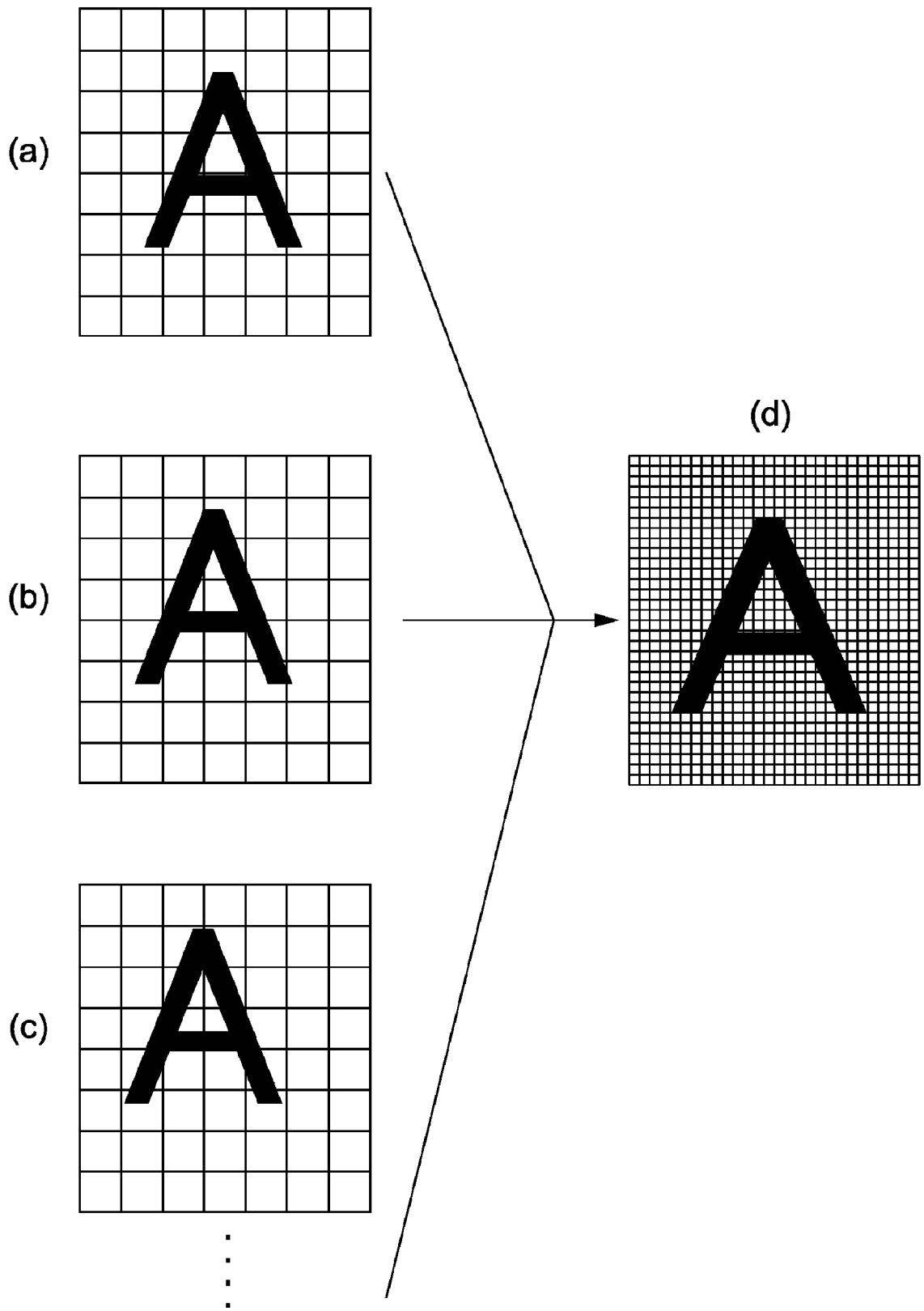
FIG. 15 illustrates an example of super resolution processing in accordance with the present invention.

FIG. 15 illustrates generating a high-resolution image from three frames of low-resolution image data. The figure shows that image data (d) can be obtained by performing super resolution processing on a plurality of frames of low-resolution image data (a), (b), (c), . . . having different phases (frame (a) is reference image data). The super resolution processing performed at this time is described in detail with reference to FIGS. 16 and 17.

Figure 16:
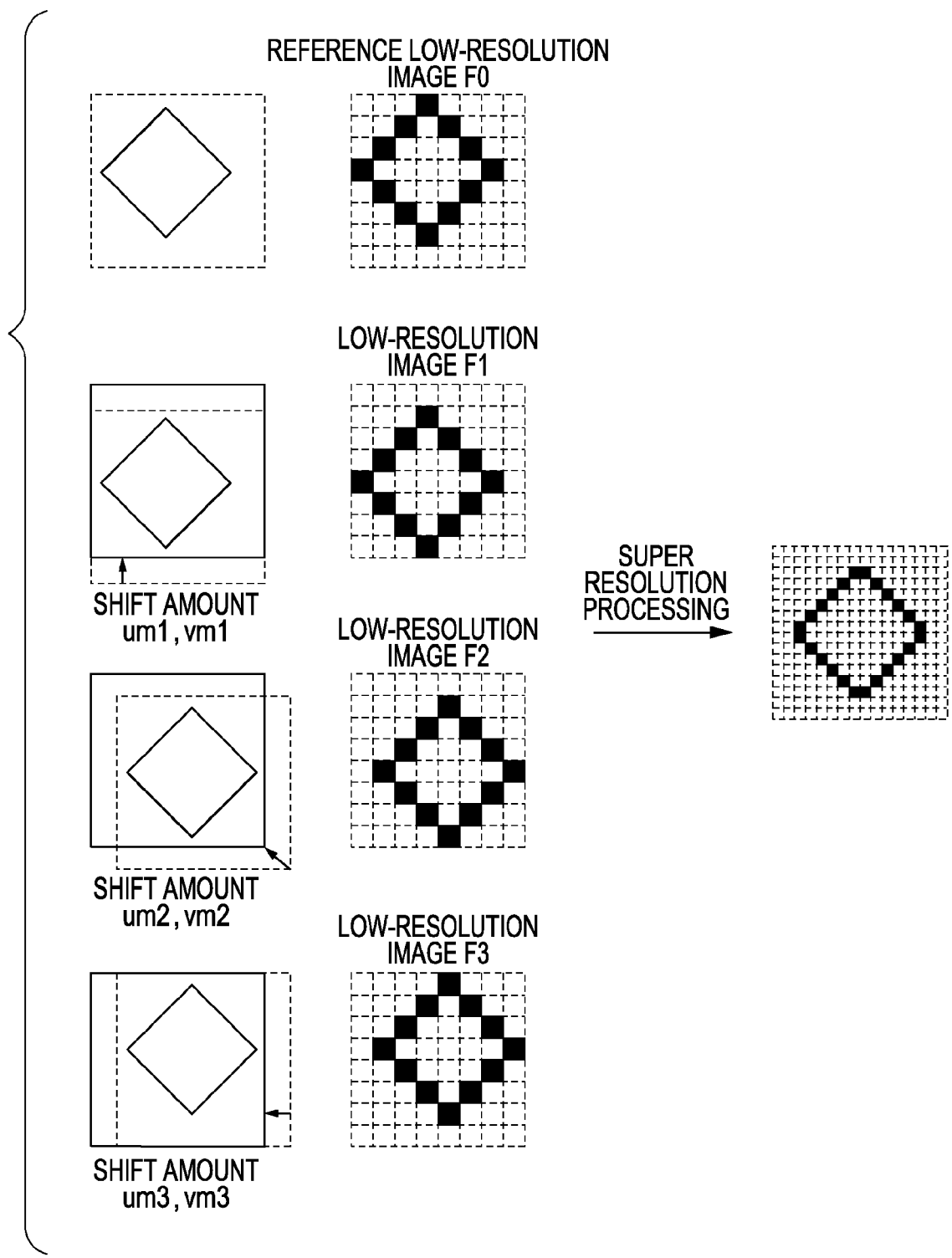
FIG. 16 illustrates an example of super resolution processing in accordance with the present invention.

FIG. 16 illustrates low-resolution image data used in super resolution processing and image data obtained through the super resolution processing. Specifically, FIG. 16 illustrates an original, reference low-resolution image data F0 that is obtained by reading the original by an area sensor, and target low-resolution image data F1 to F3 having phases slightly shifted with respect to the reference image data F0. A broken-line rectangle surrounding the original indicates an area where the reference low-resolution image data F0 is read by the area sensor. Solid-line rectangles indicate areas where the target low-resolution image data F1 to F3 are read by the area sensor.

In this embodiment, a shift amount in the main scanning direction is represented by "um" and a shift amount in the sub-scanning direction is represented by "vm". Those shift amounts in the target low-resolution image data Fn (n=1 to 3) are represented by "umn" and "vmn". For example, as illustrated in FIG. 16, the target low-resolution image data F1 has a shift in the sub-scanning direction with respect to the reference low-resolution image F0, the shift amount being represented by um1 and vm1. Likewise, the shift amounts in the target low-resolution image data F2 are represented by um2 and vm2, and the shift amounts in the target low-resolution image data F3 are represented by um3 and vm3.

The shift amounts umn and vmn in the respective pieces of target low-resolution image data Fn (n=1 to 3) are calculated based on the reference low-resolution image data F0 and the target low-resolution image data F1 to F3. The calculation is performed in a predetermined calculating method based on inclination information of the area sensor stored in a ROM (Read Only Memory) in advance.

In FIG. 16, the shifts in the respective pieces of target low-resolution image data are schematically illustrated in units of pixels. However, in the reading by the area sensor according to this embodiment, a phase shift of smaller than one pixel occurs in the main scanning direction and the sub-scanning direction. By using this slight shift, the resolution of an image can be increased as described above.

Therefore, among the respective pixels constituting image data generated through super resolution processing (hereinafter referred to as "generated pixels"), there exists a pixel that does not exist either in the reference low-resolution image data or in the target low-resolution image data.

For such a pixel, a predetermined interpolating process is performed by using pixel data indicating pixel values of pixels around the generated pixel, so as to increase resolution while performing synthesis. As the interpolating process, bilinear interpolation, bicubic interpolation, nearest-neighbor interpolation, and the like can be used.

Figure 17:
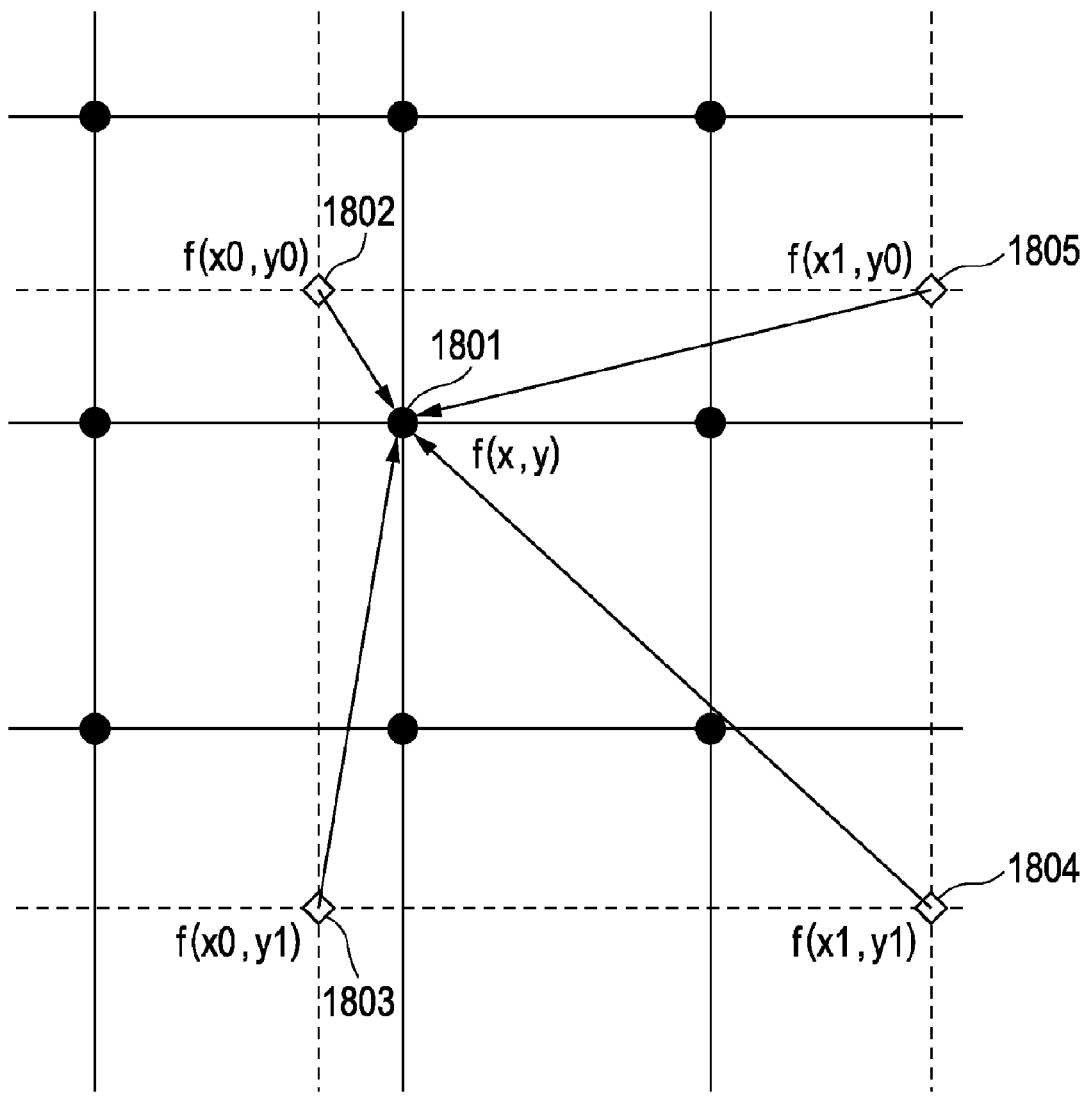
FIG. 17 illustrates an example of super resolution processing in accordance with the present invention.

For example, an interpolating process using the bilinear interpolation is described with reference to FIG. 17. First, a nearest pixel 1802 that is the nearest to the position (x, y) of a generated pixel 1801 is extracted from the reference low-resolution image data and the target low-resolution image data. Then, four pixels surrounding the generated pixel 1801 in the target low-resolution image data in FIG. 17 are determined to be surrounding pixels 1802 to 1805. Then, a predetermined weight is added to data values of the surrounding pixels, the data values are averaged, and a data value of the generated pixel is obtained by using the following expression.

$$f(x, y)=[|x1-x|\{|y1-y|f(x0, y0)+|y-y0|f(x0, y1)\}+|x-x0|\{y1-y|f(x, y0)+|y-y0|f(x1, y1)\}]/|x1-x0||y1-y0|$$

By performing the above-described process on the respective generated pixel positions, a super-resolution image having double resolution illustrated in FIG. 16 can be obtained. The resolution factor is not limited to double but various factors may be adopted. The resolution of the super-resolution image is higher as the number of data values of a plurality of pieces of low-resolution image data used in the interpolating process is larger.

Figure 2A:
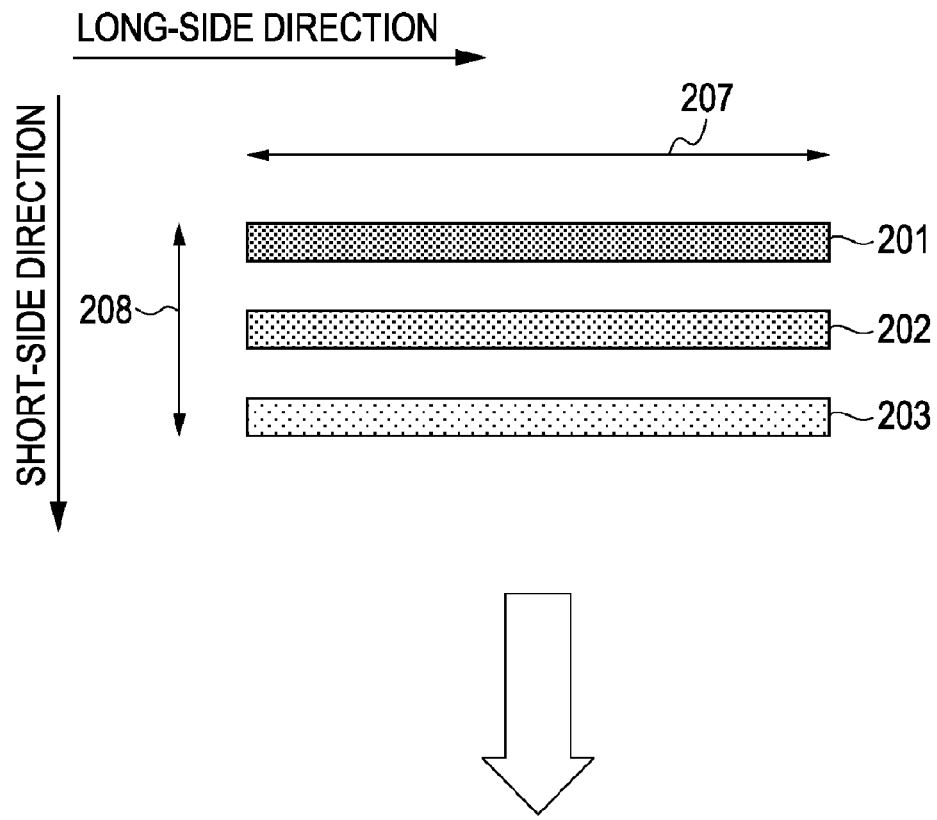
FIGS. 2A and 2B illustrate color line sensors used in a first embodiment.

Next, a process according to this embodiment is described. FIG. 2A illustrates line sensors serving as a solid-state image pickup element in the image reading unit 101 used in this embodiment. A line sensor 201 has a red color filter, a line sensor 202 has a green color filter, and a line sensor 203 has a blue color filter. Data of a main scanning line is obtained from each of the line sensors.

Specifically, red image data (hereinafter R image data) is obtained from the line sensor 201, green image data (hereinafter G image data) is obtained from the line sensor 202, and blue image data (hereinafter B image data) is obtained from the line sensor 203. By combining those pieces of image data, RGB color image data is obtained. A long-side direction 207 of the sensors indicates the main scanning direction, whereas a short-side direction 208 of the sensors indicates the sub-scanning direction.

In an image processing apparatus performing typical printing, when an original image is placed at a specified position on a platen, reflected light of light applied to the original image from a light source (which produces light directed parallel to the vertical direction of the original image) under the original image is collected by a sensor. The reflected light is taken in without inclination with respect to the sensor.

The reflected light as image data of a line obtained through parallel scanning by the light source is collected in parallel with the horizontal direction (long-side direction) of the sensors illustrated in FIG. 2A. Thus, the sensors are placed at the position where an original image can be scanned in with almost no inclination. A slight inclination that actually exists is corrected and is compensated for to minimize the inclination. The sensor set position for realizing output of an original image is called a "reference set position" of the sensors.

In a typical color scanner, the line sensors 201 to 203 are arranged in the device at the reference set position. As illustrated in FIG. 2A, the line sensors 201, 202, and 203 are arranged in parallel with each other at predetermined intervals. Accordingly, shifts occur among the R image data, G image data, and B image data in the sub-scanning direction. That is, phase shifts occur. Typically, compensation is performed to correct and reduce the phase shifts in units of pixels by image processing, such as offset correction.

Figure 2B:
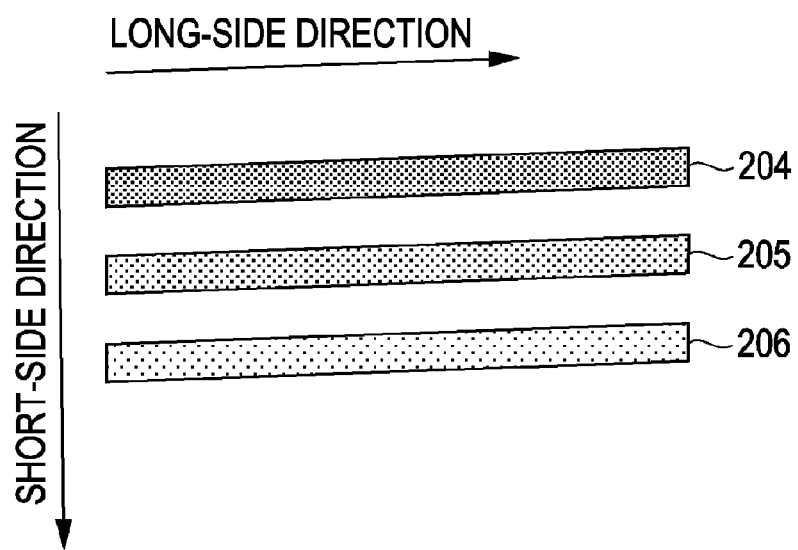

On the other hand, in this embodiment, frame image data is obtained by placing the line sensors with inclination with respect to the reference set position, as illustrated in FIG. 2B. That is, the long-side direction illustrated in FIG. 2A is not parallel with the long-side direction illustrated in FIG. 2B. Therefore, the main scanning direction is not parallel with the long-side direction illustrated in FIG. 2B. A line sensor 204 has a red color filter, a line sensor 205 has a green color filter, and a line sensor 206 has a blue color filter. These color filters are inclined.

Figure 3:
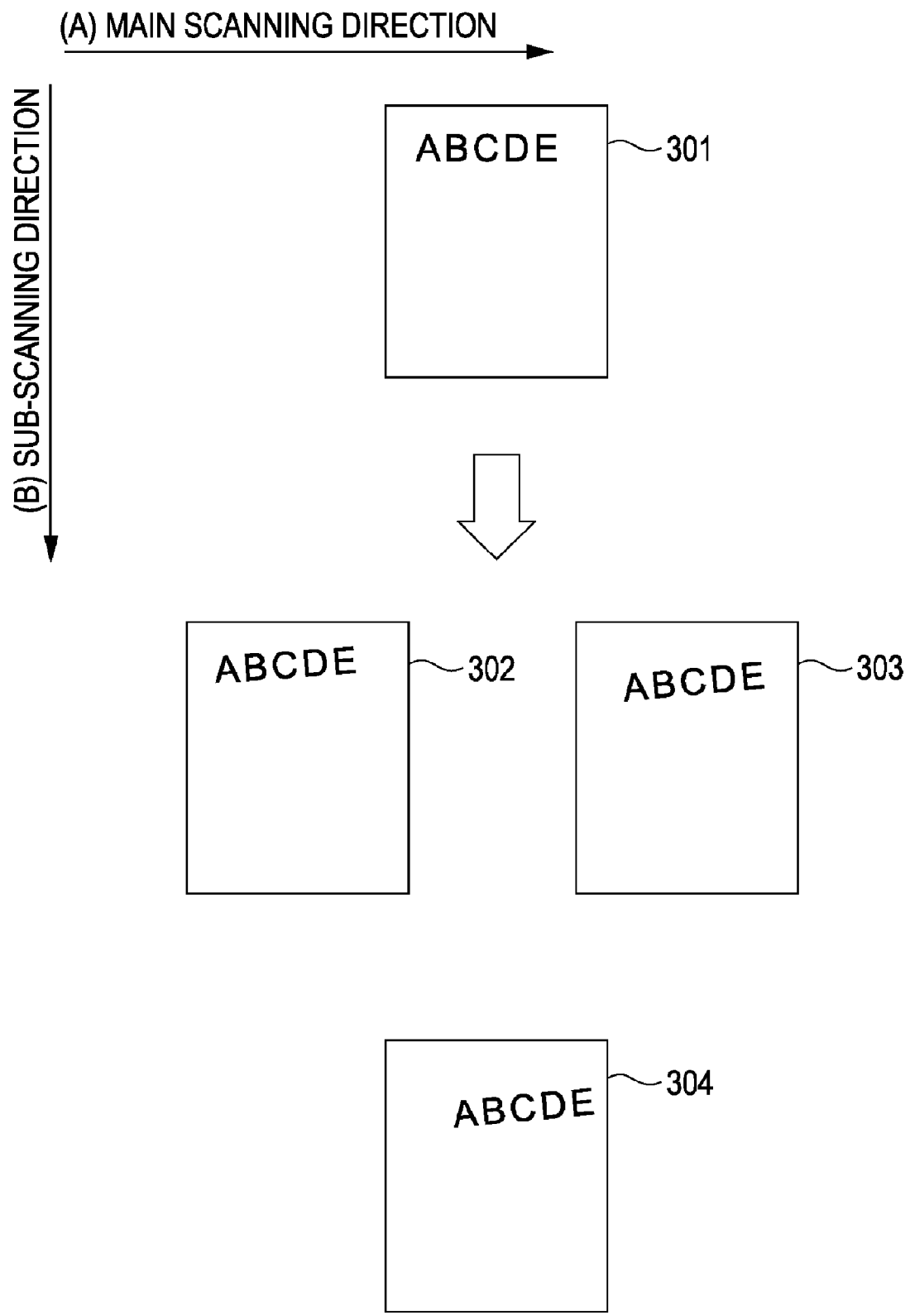
FIG. 3 illustrates image data obtained through scan of an original by inclined line sensors used in the first embodiment.

FIG. 3 illustrates an example where an original is scanned by using those line sensors. Pieces of frame image data 302 to 304 are scanned in through scanning of an original 301. Hereinafter, frame image data scanned in through the red color filter is called R image data, frame image data scanned in through the green color filter is called G image data, and frame image data scanned in through the blue color filter is called B image data.

The image data 302 is scanned in by the line sensor 204, the image data 303 is scanned in by the line sensor 205, and the image data 304 is scanned in by the line sensor 206. Each of the pieces of image data 302 to 304 is expressed as one frame of image data. The image data 302 is set as an R channel, the image data 303 is set as a G channel, and the image data 304 is set as a B channel.

Thus, the image data obtained in this embodiment has three channels. Since the line sensors are inclined and are placed at intervals, frame image data having phase shifts in the main scanning direction and the sub-scanning direction in the respective channels can be obtained, like the pieces of image data 302 to 304.

Also, since the line sensors are placed at intervals, the positions where the adjacent line sensors read an original image shift in the sub-scanning direction. That is, pieces of frame image data having phase shifts in the sub-scanning direction can be obtained.

Furthermore, by placing the line sensors with inclination with respect to the reference set position, the positions where the adjacent line sensors read an image shift in the main scanning direction and the sub-scanning direction. That is, pieces of frame image data having phase shifts in the main scanning direction and the sub-scanning direction can be obtained.

If the phase shifts that occur in the above-described way are in units of sub-pixels, super resolution processing can be performed by using three pieces of frame image data: R image data, G image data, and B image data, so that high-resolution image data can be obtained. To cause phase shifts in units of sub-pixels, the intervals and angles of the line sensors may be adjusted.

Figure 6:
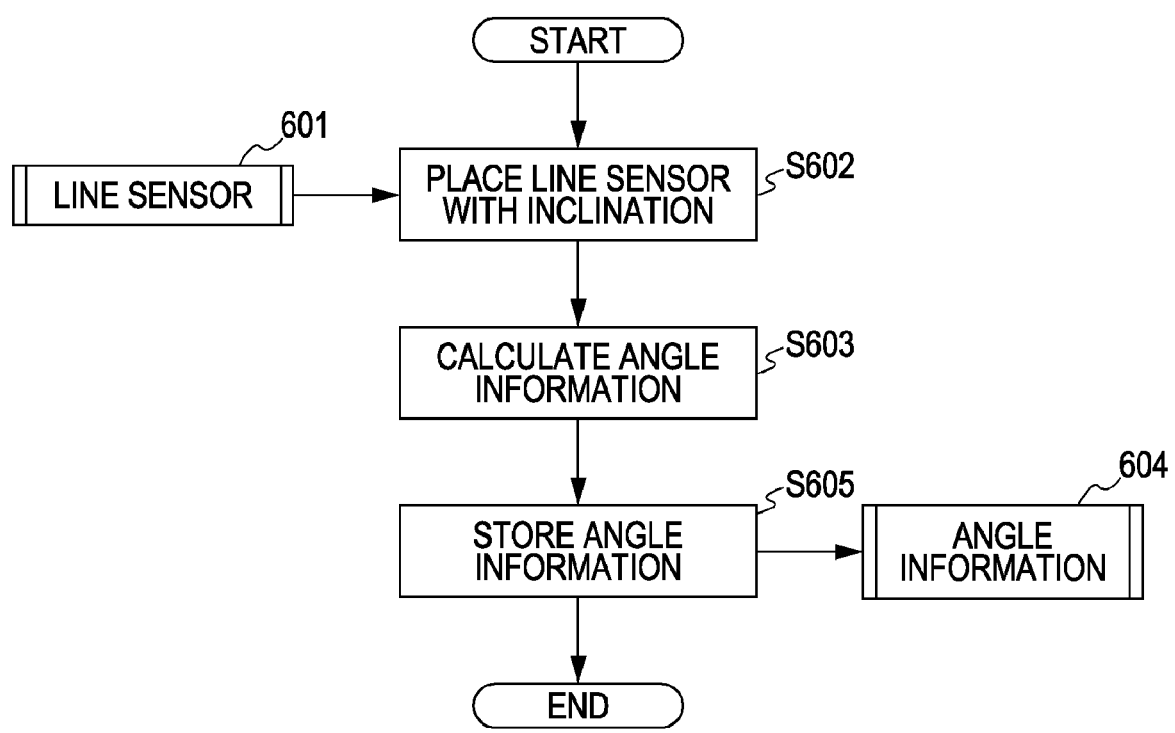
FIG. 6 is a flowchart illustrating a process of placing the line sensors with inclination according to the first embodiment.

FIG. 6 illustrates a process of placing a line sensor with inclination. First, a line sensor 601 is placed with inclination in step S602. The inclination angle of the line sensor 601 with respect to the reference set position is defined as an inclination angle $\theta$.

In step S603, the inclination angle $\theta$ is calculated. Any method can be used to calculate the angle $\theta$. For example, the inclination angle $\theta$ can be obtained at the time when the line sensor 601 is mounted in a process of assembling an MFP including the line sensor 601. The inclination angle $\theta$ is held in a storage area in the MFP as a value unique to the mounted device. The inclination angle $\theta$ may be obtained from the storage area. The calculated angle $\theta$ is stored as angle information 604 in step S605.

Figure 7:
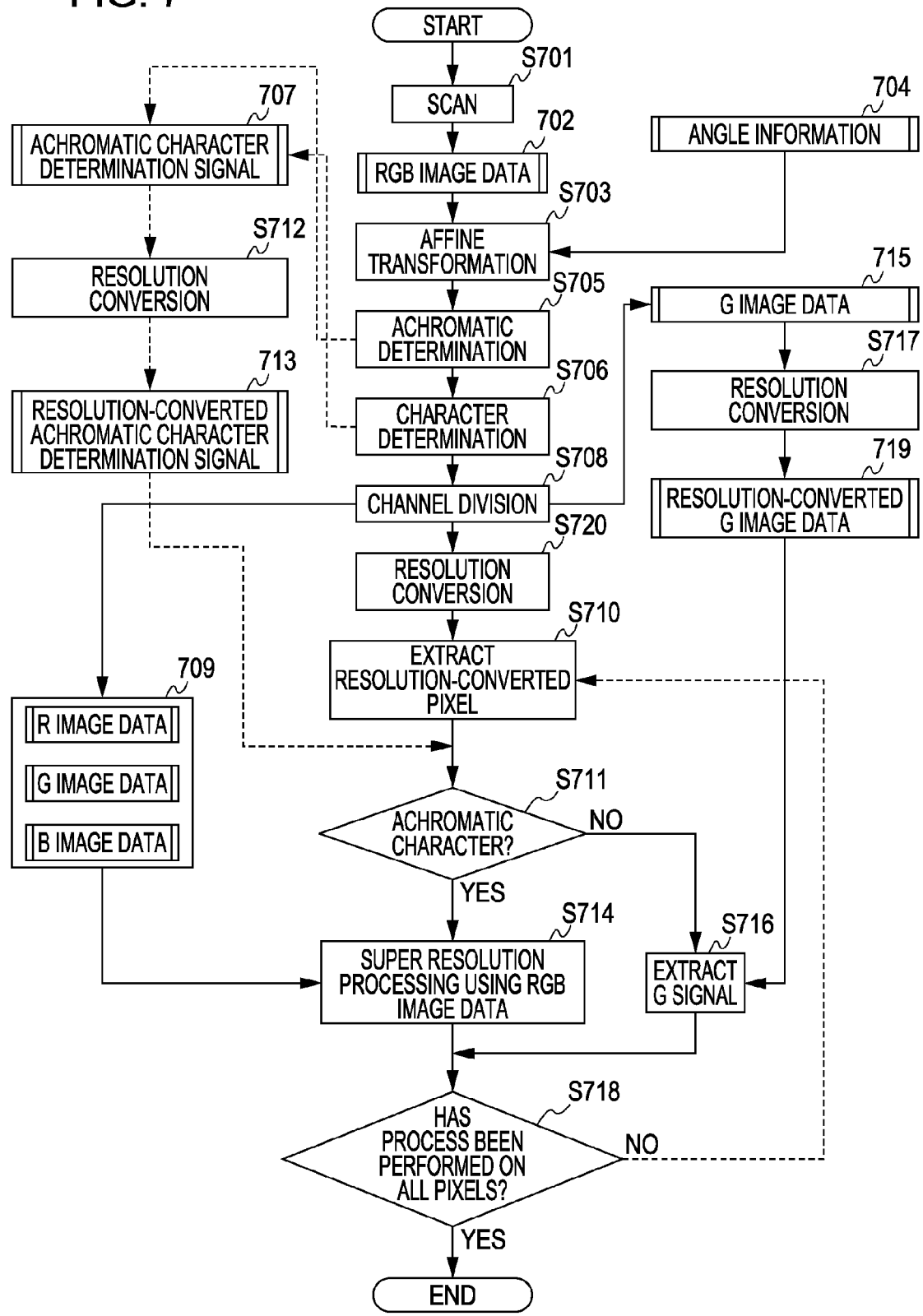
FIG. 7 is a flowchart illustrating a process according to the first embodiment.

A process using the line sensors placed with inclination according to this embodiment is described with reference to FIG. 7. This embodiment is based on the assumption that an original image is scanned at resolution of 600 dpi and that image data of resolution of 1200 dpi is obtained through super resolution processing. Other than this form, any form may be applied as long as resolution is increased through super resolution processing.

In step S701, the image reading unit 101 scans an original image so as to obtain RGB image data 702. In this state, frame image data is inclined as the pieces of frame image data 302 to 304 illustrated in FIG. 3. Thus, affine transformation is performed by using angle information 704 in step S703 so as to rotate the frame image data by the inclination in the scanning direction. Accordingly, the inclination of the frame image data is corrected.

The angle information 704 is the same as the angle information 604 calculated in the process illustrated in FIG. 6. Any method other than the affine transformation may be used as a method for correcting the inclined frame image data. The correction of the inclined image data enables acquisition of a plurality of frames of image data that have phase shifts in units of sub-pixels in the main scanning direction and the sub-scanning direction and that are compensated for to correct the inclination of the frame image data and to reduce the inclination.

Then, achromatic determination is performed in step S705, and character determination is performed in step S706. An achromatic character determination signal 707 is generated based on the two determination results. The achromatic character determination signal 707 is generated by providing a bit to a portion of an achromatic character in each pixel in prepared data of resolution of 1200 dpi.

Achromatic determination and character determination are performed in conventional MFPs, and any method may be used for achromatic and character determinations in the present invention without problem. Moreover, the achromatic character determination signal does not need to have any specific format.

Figure 4:
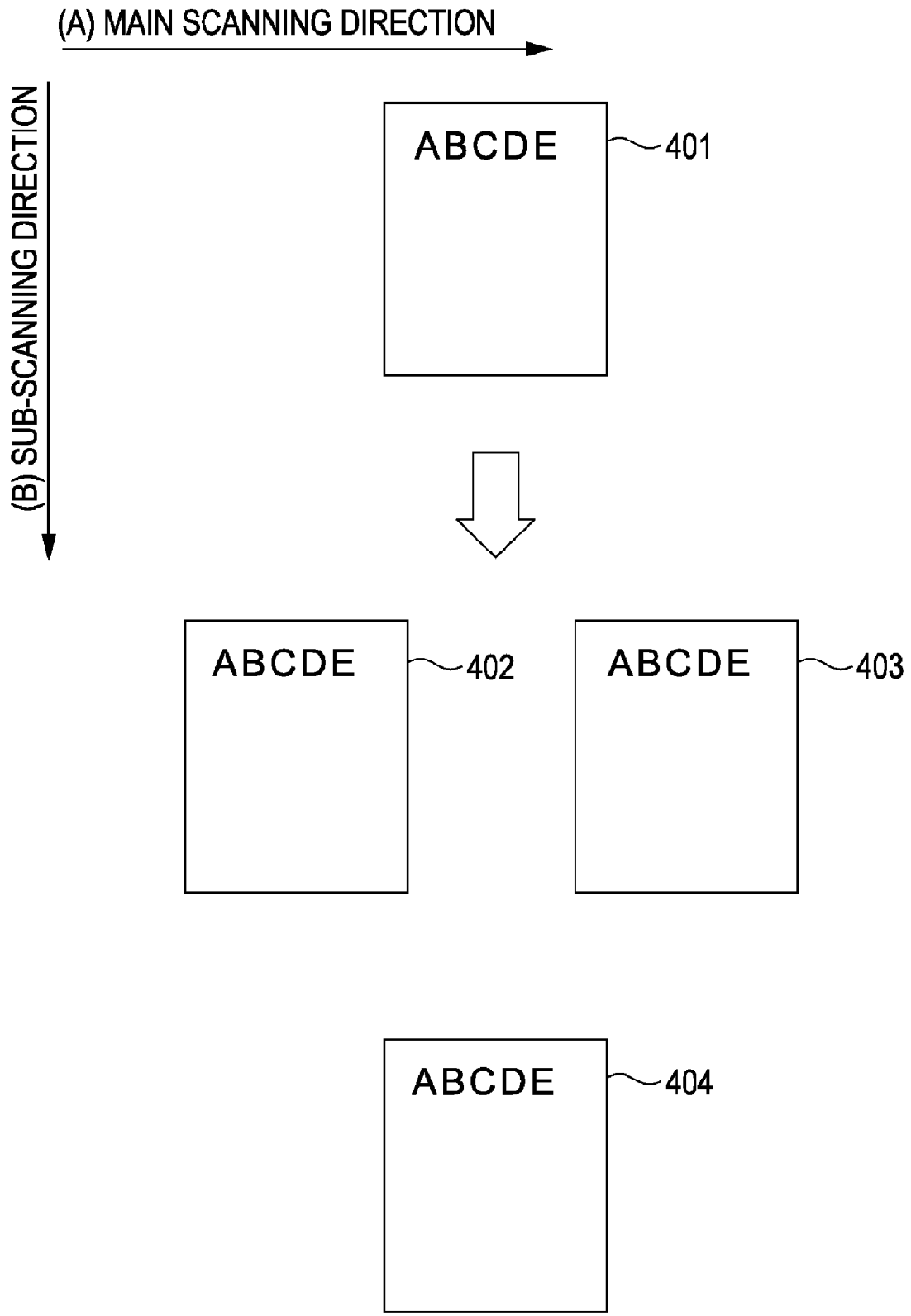
FIG. 4 illustrates image data obtained through scan of a monochrome original by color line sensors.

The reason why achromatic characters are determined in this embodiment is described with reference to FIGS. 4 and 5. An original 401 illustrated in FIG. 4 includes black characters, that is, achromatic characters. This original is scanned by the color scanner and the obtained data is divided into R image data 402, G image data 403, and B image data 404 as frame image data. Then, signal values of black character portions in the respective pieces of frame image data are very similar to each other.

The similarity here is determined in the following manner, for example. To determine the degree of similarity between the signal value of the R image data 402 and the signal value of the G image data 403 detected from the black portion of the image, it is determined whether the percentage of the signal value of the R image data with respect to the signal value of the G image data is in the range of 90 to 110%. If the percentage is in the range of 90 to 110%, it is determined that the signal value of the R image data is similar to the signal value of the G image data. The determination is made in the same manner also for the other image data.

Figure 5:
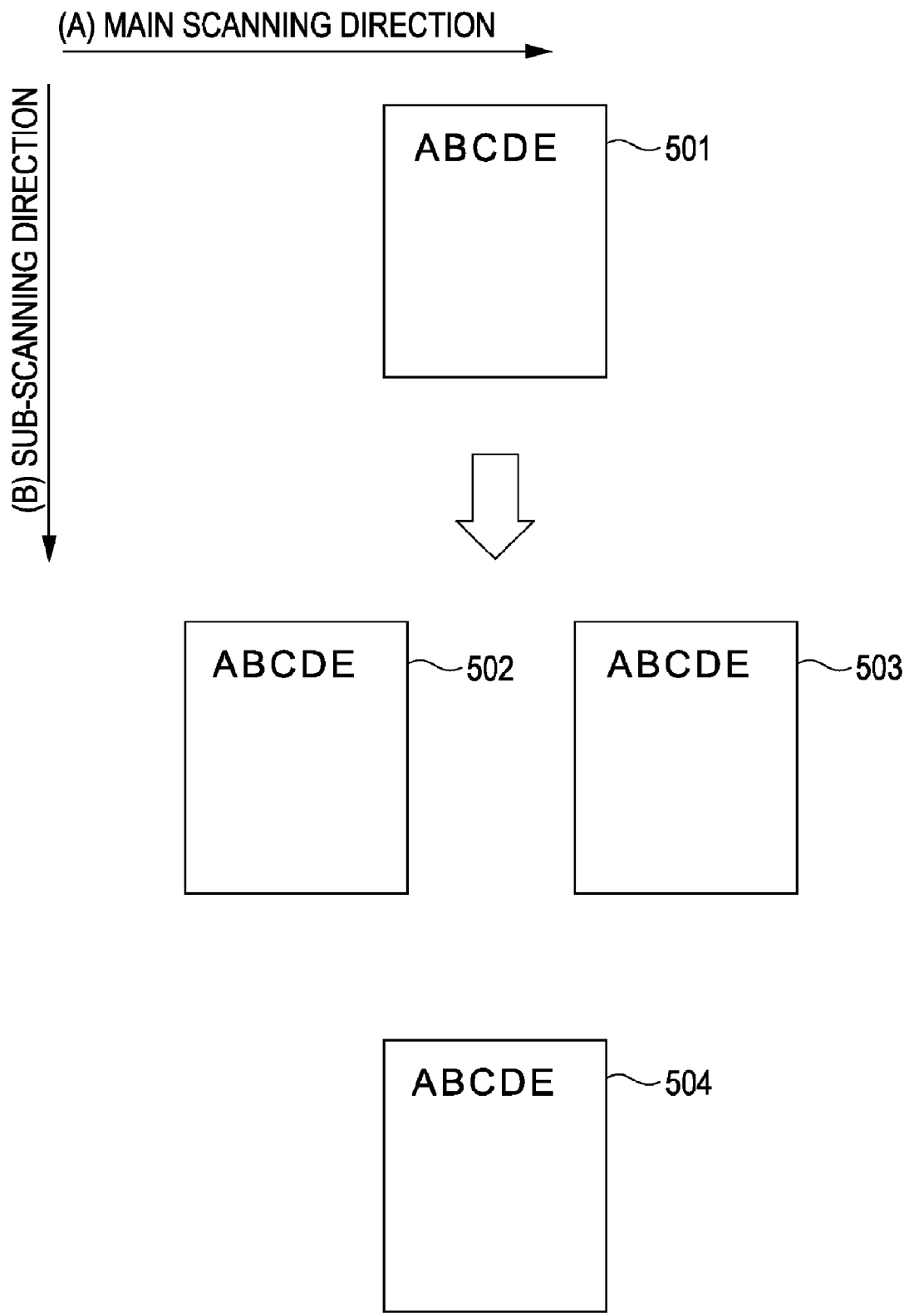
FIG. 5 illustrates image data obtained through scan of a color original by color line sensors.

On the other hand, an original image 501 illustrated in FIG. 5 includes magenta characters, that is, chromatic characters. The original image 501 is scanned by the color scanner, and the obtained data is divided into R image data 502, G image data 503, and B image data 504. Then, unlike in the achromatic characters, signal values of the respective pieces of frame image data are not all the same.

In the example illustrated in FIG. 5, the signal values of the R image data 502 and the B image data 504 are significantly different from the signal value of the G image data 503. However, in this case of magenta, the R image data 502 and the B image data 504 have similar signal values. In this example, if the signal values are dissimilar to each other, super resolution processing is not executable even if the phases are different in units of sub-pixels. Thus, super resolution processing is performed on only the pixels having similar signal values by using achromatic determination. In this embodiment, the processing is performed particularly on an achromatic character portion. However, the processing may be performed on any achromatic pixel.

Referring back to FIG. 7, channel division is performed in step S708 on the image data on which character determination is performed in step S706, so as to divide the image data into R image data, G image data, and B image data 709.

Then, in step S720, resolution conversion is performed on the frame image data including the R image data, G image data, and B image data. For example, as in this embodiment, when an image is scanned by the scanner of 600 dpi and data of 1200 dpi is generated, the resolution is converted to 1200 dpi. Here, a method for resolution conversion is not specified. For example, linear scaling may be adopted. Then, in step S710, a pixel is extracted from the resolution-converted image data.

On the other hand, resolution conversion is performed on the achromatic character determination signal 707 in step S712 so as to generate a resolution-converted achromatic character determination signal 713. In the case of the achromatic character determination signal of 600 dpi, resolution conversion is performed by linear interpolation so as to increase the resolution to 1200 dpi. Linear interpolation is used as resolution conversion in this embodiment, but any other method may alternatively be used.

Likewise, resolution conversion to 1200 dpi is performed on G image data 715 in step S717 so as to generate resolution-converted G image data 719. Here, the G image data 715 is the same data as the G image data (709) obtained through channel division at step S708.

Super resolution processing is performed on only the achromatic character portion, and thus data on which resolution conversion such as linear interpolation has been performed is used. This embodiment uses G image data that is often used as representative when data scanned by a color scanner is to be output as monochrome data. However, image data of another channel or image data containing signals of a plurality of channels may be used.

In step S711, it is determined whether the resolution-converted pixel extracted in step S710 is an achromatic character by using the resolution-converted achromatic character determination signal 713. If the extracted resolution-converted pixel is determined to be an achromatic character (YES in step S711), (which means that the signal values of black character portions in the respective pieces of frame image data: the R image data, G image data, and B image data 709 are very similar to each other), then, super resolution processing, which is high-resolution conversion, is performed in the above-described process by using the R image data, G image data, and B image data 709 in step S714, so as to output monochrome image data having resolution higher than that of the sensors of the device.

The super resolution processing performed on the achromatic portion according to this embodiment is different from a conventional technique of performing a process of increasing resolution and smoothing only on an edge portion of characters, and is capable of increasing resolution of even an indistinguishable character that is printed in a small point.

If the extracted resolution-converted pixel is determined not to be an achromatic character (NO in step S711), super resolution processing is not performed, and the process proceeds to step S716 where a G signal is extracted from the resolution-converted G image data 719.

After the above-described process, it is determined in step S718 whether the process has been performed on all the pixels. If the process has not been performed on all the pixels, the process returns to step S710, where another resolution-converted pixel is extracted and the process is repeated. If the process has been performed on all the pixels, the process ends.

According to this embodiment, resolution of specific pixels of achromatic characters or the like can be increased when monochrome copy or monochrome transmission is performed in an MFP including a color scanner.

Next, a description is given about a second embodiment of performing super resolution processing based on a comparison result of signal values of respective channels. In the first embodiment, whether super resolution processing is to be performed is determined for an achromatic portion. In the second embodiment, a description is given about a method for determining whether super resolution processing is to be performed by comparing signal values of R image data, G image data, and B image data, not by using the determination result. The configuration of the MFP and the process of placing line sensors with inclination with respect to the reference set position are the same as those in the first embodiment, and thus further redundant description thereof is omitted.

Figure 8:
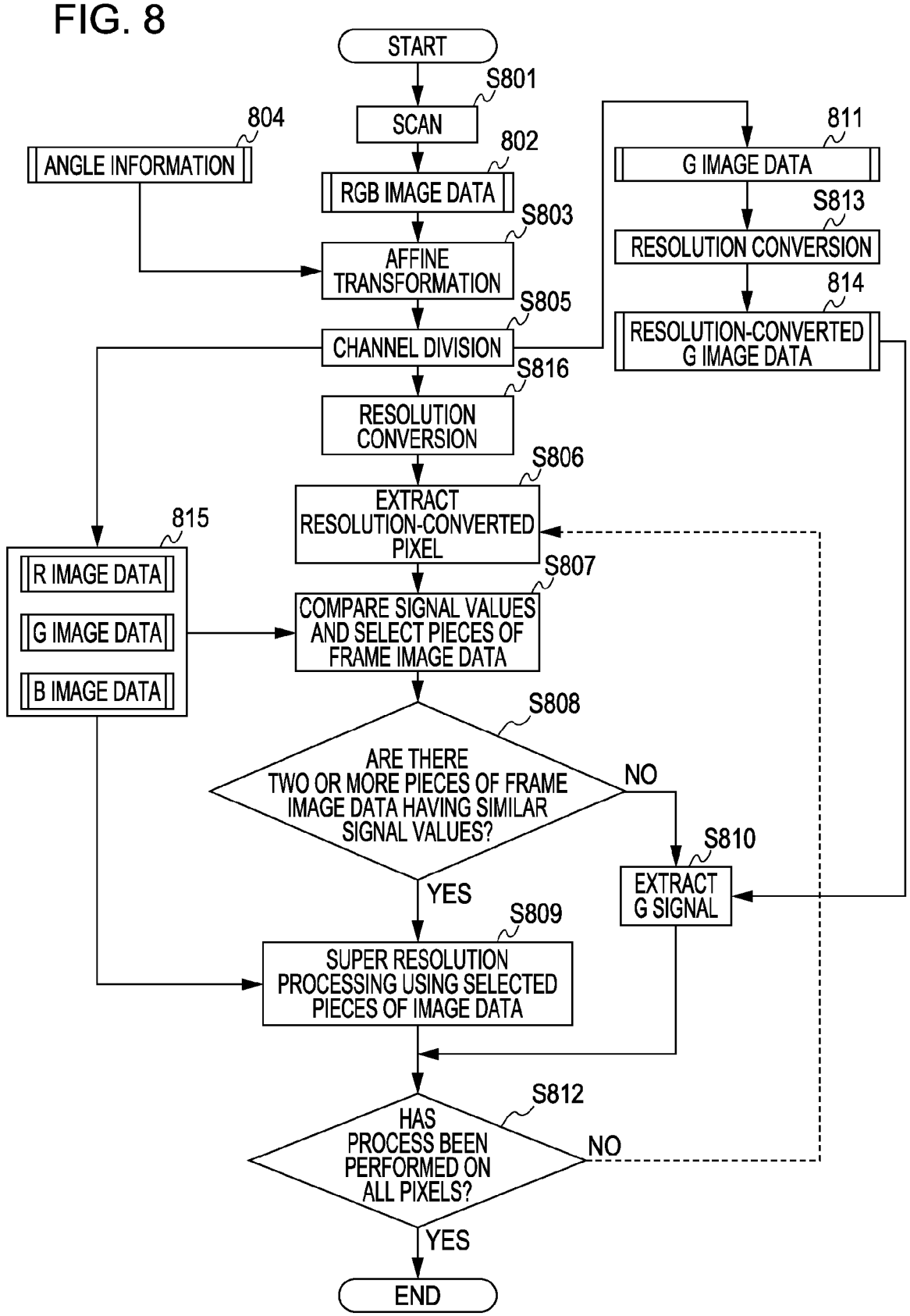
FIG. 8 is a flowchart illustrating a process according to a second embodiment.

A process according to this embodiment is described with reference to FIG. 8. As in the first embodiment, the second embodiment is based on the assumption that scanning is performed at resolution of 600 dpi and that image data of resolution of 1200 dpi is obtained through super resolution processing. Any other form may alternatively be applied so long as resolution is increased through super resolution processing, as in the first embodiment.

In step S801, RGB image data 802 is obtained through scanning. Since the line sensors are inclined as in the first embodiment, affine transformation is performed in step S803 by using angle information 804, so as to correct the inclination of the frame image data and to perform compensation to reduce the inclination.

As in the first embodiment, the angles and setting intervals of the respective line sensors of red, green, and blue are adjusted. Thus, frame image data having phase shifts in units of sub-pixels among respective channels are obtained.

Then, channel division is performed in step S805 so as to obtain R image data, G image data, and B image data 815. Then, in step S816, resolution conversion is performed on the frame image data obtained through the channel division.

For example, as in this embodiment, when data is obtained by a scanner of 600 dpi and data of 1200 dpi is to be generated, the resolution is converted to 1200 dpi. Here, any method such as linear scaling may be adopted to convert the resolution. Then, in step S806, a pixel is extracted from resolution-converted frame image data.

On the other hand, resolution conversion is also performed on G image data 811 in step S813 so as to generate resolution-converted G image data 814. As in the first embodiment, when an original image is scanned at resolution of 600 dpi, resolution conversion is performed by linear interpolation so as to increase the resolution to 1200 dpi. Here, the G image data 811 is the same data as the G image data (815) obtained through channel division at step S805. As in the first embodiment, G image data is used as a representative value, but frame image data of another channel or frame image data containing signals of a plurality of channels may alternatively be used.

In step S807, signal values of the pieces of frame image data are compared by using the R image data, G image data, and B image data 815, so as to select pieces of frame image data used for super resolution processing. In the first embodiment, super resolution processing is performed only when the signal values of pieces of frame image data obtained in all the channels are similar to each other, e.g., in the case of an achromatic portion. In the case of a chromatic portion, the signal values of pieces of frame image data obtained in all the channels are not similar to each other, but the signal values of two pieces of frame image data may be similar to each other.

In the example of magenta characters illustrated in FIG. 5, the G image data 503 has a signal value different from the other two signal values, but the signal values of the R image data 502 and the B image data 504 are similar to each other. At this time, whether the respective pieces of frame image data are similar to each other is determined in the above-described determining method, for example. In this way, it is determined whether there are signal values similar to each other by obtaining signal values of the respective pieces of frame image data, and pieces of frame image data having similar signal values are selected.

If it is determined in step S808 that there are two or more pieces of frame image data having similar signal values (YES in step S808), the process proceeds to step S809, where super resolution processing, which is high-resolution conversion, is performed in the above-described process by using the selected pieces of frame image data having similar signal values. As a result, monochrome image data having resolution higher than the resolution of the sensors of the device can be output.

In the achromatic portion, signal values of all the pieces of frame image data are similar to each other, and thus three pieces of frame image data are selected as data to be used in super resolution processing. Accordingly, super resolution processing can be performed by using all of the R image data, G image data, and B image data.

In the chromatic portion, too, super resolution processing can be performed if there are selected two pieces of frame image data, although the effect is smaller than that in the case where three pieces of frame image data are used.

If it is determined in step S808 that there are not two or more pieces of frame image data (NO in step S808), the process proceeds to step S810, where a G signal is extracted from the resolution-converted G image data 814. In step S812, it is determined whether the process has been performed on all the pixels. If the process has not been performed on all the pixels, the process returns to step S806 and the process is repeated. If the process has been performed on all the pixels, the process ends.

According to this embodiment, the resolution of specific pixels can be increased when monochrome copy or monochrome transmission is performed in an MFP including a color scanner. Particularly, in this embodiment, super resolution processing can be performed not only on an achromatic portion but also on a specific chromatic portion, so as to increase the resolution.

Next, a description is given about a third embodiment of performing super resolution processing by searching for image data having a signal value similar to that of reference image data, which is frame image data of a specific channel. In the preceding embodiments, super resolution processing is performed by using an achromatic determination result or by comparing signal values of respective pieces of image data. In this embodiment, super resolution processing is performed by giving attention to a specific channel.

Figure 10A:
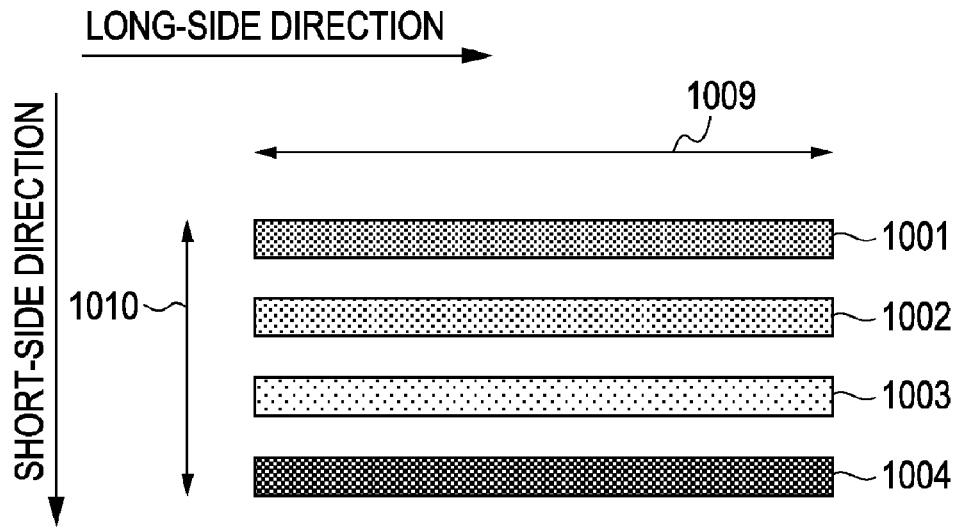
FIGS. 10A and 10B illustrate line sensors used in a third embodiment.
Figure 10A:
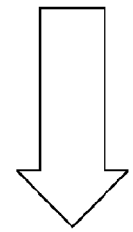

In this embodiment, line sensors different from those in the preceding embodiments are included. FIG. 10A illustrates an example of sensors used in this embodiment. A line sensor 1001 has a red color filter, a line sensor 1002 has a green color filter, and a line sensor 1003 has a blue color filter, which are the same as the line sensors 201 to 203. As in the preceding embodiments, a long-side direction 1009 of the sensors is the main scanning direction, whereas a short-side direction 1010 of the sensors is the sub-scanning direction.

FIG. 10A also illustrates a line sensor 1004 having no color filter. The line sensor 1004 has no color filter and thus obtains gray-scale frame image data.

Figure 10B:
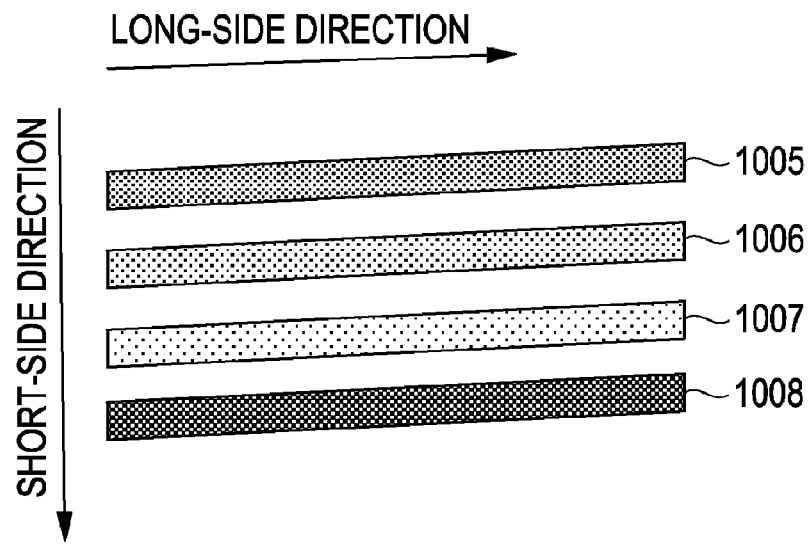

This embodiment uses line sensors 1005 to 1008 illustrated in FIG. 10B, which are the line sensors 1001 to 1004 inclined with respect to the reference set position, in order to shift a reading position on an original image. The process of placing the line sensors with inclination with respect to the reference set position is the same as that in the preceding embodiments, and thus further redundant description thereof is omitted.

Figure 11:
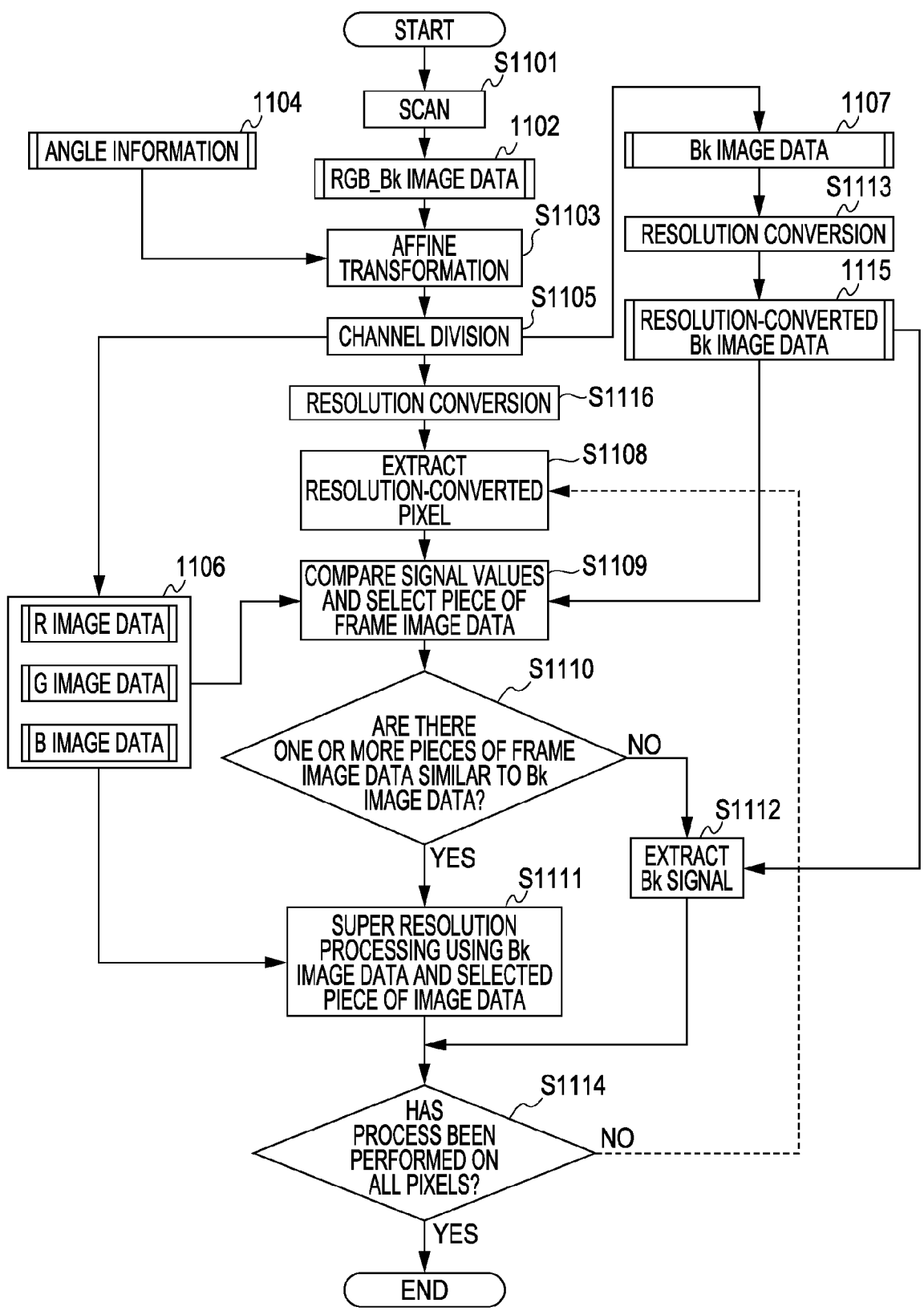
FIG. 11 is a flowchart illustrating a process according to the third embodiment.

Now, a process according to this embodiment is described with reference to FIG. 11. As in the preceding embodiments, this embodiment is based on the assumption that scan is performed at resolution of 600 dpi and that image data of resolution of 1200 dpi is obtained through super resolution processing. Any other form may alternatively be applied so long as resolution is increased through super resolution processing, as in the first embodiment.

First, scan is performed in step S1101 and RGB_Bk image data 1102 is obtained. In this embodiment, four line sensors are provided, and thus four channels of frame image data: R image data, G image data, B image data, and Bk image data are obtained. Then, as in the preceding embodiments, affine transformation is performed by using angle information 1104 in step S1103 so as to correct inclination of the frame image data and to perform compensation to reduce the inclination.

In step S1105, channel division is performed to divide the frame image data into R image data, G image data, and B image data 1106 and Bk image data 1107. Then, resolution conversion is performed on the divided frame image data in step S1116.

For example, as in this embodiment, when data is scanned by a scanner of 600 dpi and data of 1200 dpi is to be generated, the resolution is converted to 1200 dpi. Here, any method such as linear scaling may be adopted to convert the resolution. Then, in step S1108, a pixel is extracted from the resolution-converted frame image data.

On the other hand, resolution conversion is performed also on the Bk image data 1107 in step S1113 so as to generate resolution-converted Bk image data 1115. As in the first embodiment, when the resolution is 600 dpi, the resolution is converted by linear interpolation so as to increase the resolution to 1200 dpi.

Then, in step S1109, signal values of the R image data, G image data and B image data 1106 and the resolution-converted Bk image data 1115 are compared, so as to select a piece of frame image data used for super resolution processing. Here, among the R image data, G image data, and B image data 1106, the image data having a signal value similar to that of the resolution-converted Bk image data 1115 as reference image data is selected. At this time, the similarity of the respective pieces of frame image data is determined by using the above-described determining method.

Particularly, if the original is achromatic, all the pieces of frame image data are selected because the signal values thereof are similar to each other. The comparing method and a reference of selection are not specified.

Then, in step S1110, it is determined whether there are one or more pieces of frame image data similar to the Bk image data among the R image data, G image data, and B image data 1106. If it is determined that there is a similar piece of frame image data, the process proceeds to step S1111, where super resolution processing, which is high-resolution conversion, is performed in the above-described process by using the Bk image data and the selected piece of frame image data. Accordingly, monochrome image data having resolution higher than the resolution of the sensors included in the device is output.

If it is determined in step S1110 that there is no similar piece of image data, the process proceeds to step S1112, where a signal value is extracted from the resolution-converted Bk image data 1115. Finally, it is determined in step S1114 whether the process has been performed on all the pixels. If the process has not been performed on all the pixels, the process returns to step S1108, where another resolution-converted pixel is extracted and the process is repeated. If the process has been performed on all the pixels, the process ends.

In this embodiment, the image data obtained by the Bk sensor is used as reference image data, but any piece of frame image data may be selected as the reference image data. Also, a piece of frame image data of a reference channel may be selected by using the three types of line sensors illustrated in FIG. 2 as in the preceding embodiments.

According to this embodiment, resolution of specific pixels can be increased when monochrome copy or monochrome transmission is performed in an MFP including a color scanner. Particularly, according to this embodiment, by using a piece of frame image data of a specific channel as a reference, super resolution processing can be performed not only on an achromatic portion but also on a chromatic portion so as to increase the resolution.

Next, a description is given about a fourth embodiment of performing super resolution processing without inclining line sensors. In the preceding embodiments, the line sensors are inclined with respect to the reference set position so as to generate pieces image data having different phases in the main scanning direction and the sub-scanning direction, and then super resolution processing is performed. In this embodiment, super resolution processing is performed without inclining the line sensors with respect to the reference set position.

In the preceding embodiments, inclined line sensors, such as the line sensors 204 to 206 or the line sensors 1005 to 1008, are used. In this embodiment, line sensors placed at the reference set position, such as the line sensors 201 to 203 or 1001 to 1004, are used.

Figure 9:
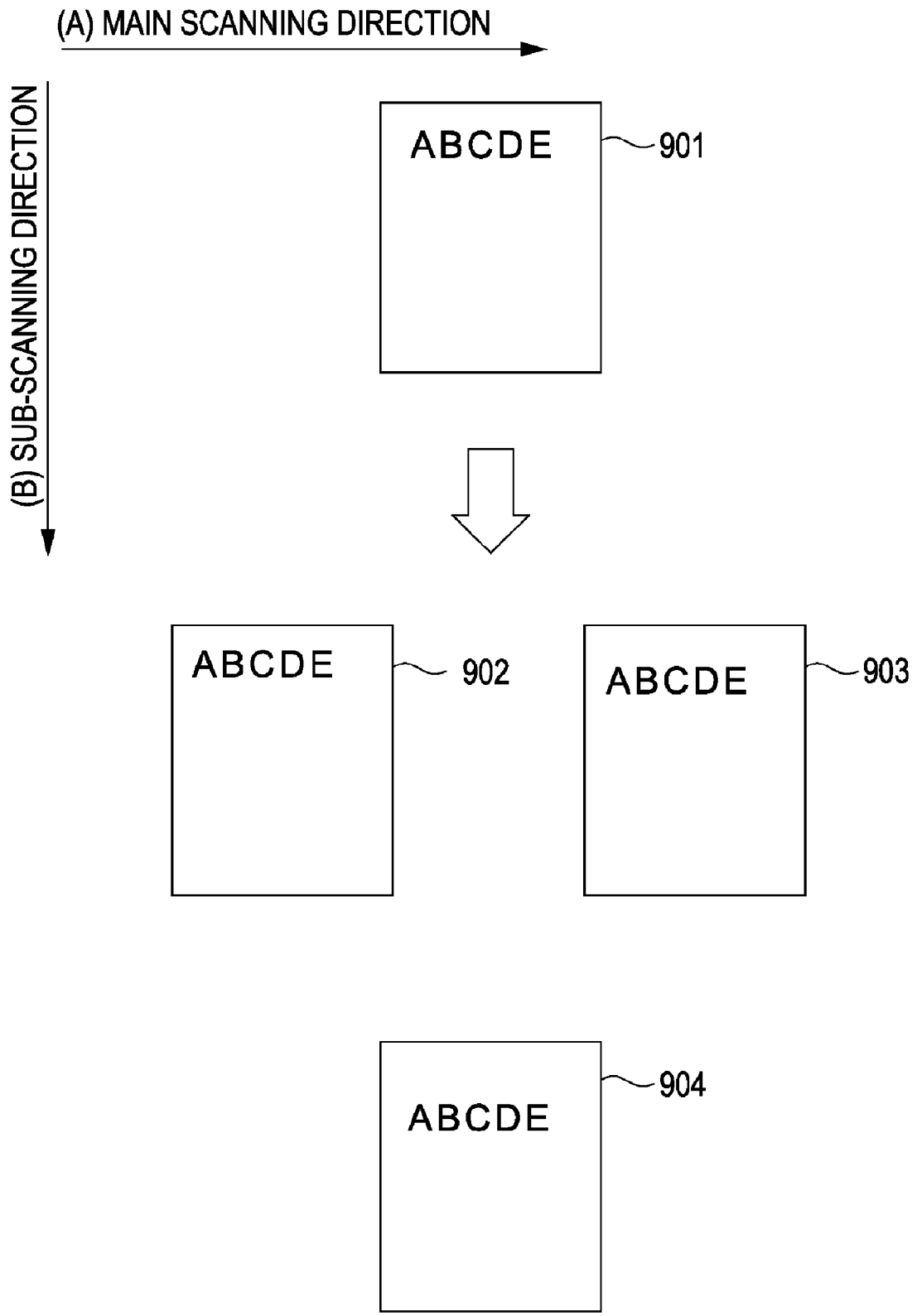
FIG. 9 illustrates image data obtained through scan of an original by line sensors used in a fourth embodiment.

FIG. 9 illustrates an example where an original is scanned by using the line sensors 201 to 203. Reference numeral 901 in FIG. 9 denotes an original image. Frame image data 902 is obtained by allowing the line sensor 201 having a red color filter to scan the original image 901. Frame image data 903 is obtained by allowing the line sensor 202 having a green color filter to scan the original image 901. Frame image data 904 is obtained by allowing the line sensor 203 having a blue color filter to scan the original image 901. Those pieces of frame image data 902 to 904 have the same phase in the main scanning direction because the line sensors are not inclined.

However, intervals exist among the line sensors 201 to 203 in the sub-scanning direction. Currently, the intervals can be reduced to the length corresponding to two pixels in design. Typically, a phase shift, which is a shift in reading position caused by the intervals, is corrected by image processing such as offset correction. Accordingly, a phase shift in units of pixels is corrected.

However, when a phase shift is corrected by offset correction or the like, a phase shift can be corrected in units of pixels, but a phase shift in units of sub-pixels may remain. Actually, if a phase shift in units of sub-pixels is small, processing can be performed by ignoring the phase shift. In this embodiment, however, a slight phase shift in units of sub-pixels in the sub-scanning direction is not ignored and is used. Then, super resolution processing can be performed by using the slight phase shift that remains in the sub-scanning direction. Accordingly, the resolution can be increased only in the sub-scanning direction.

Figure 12:
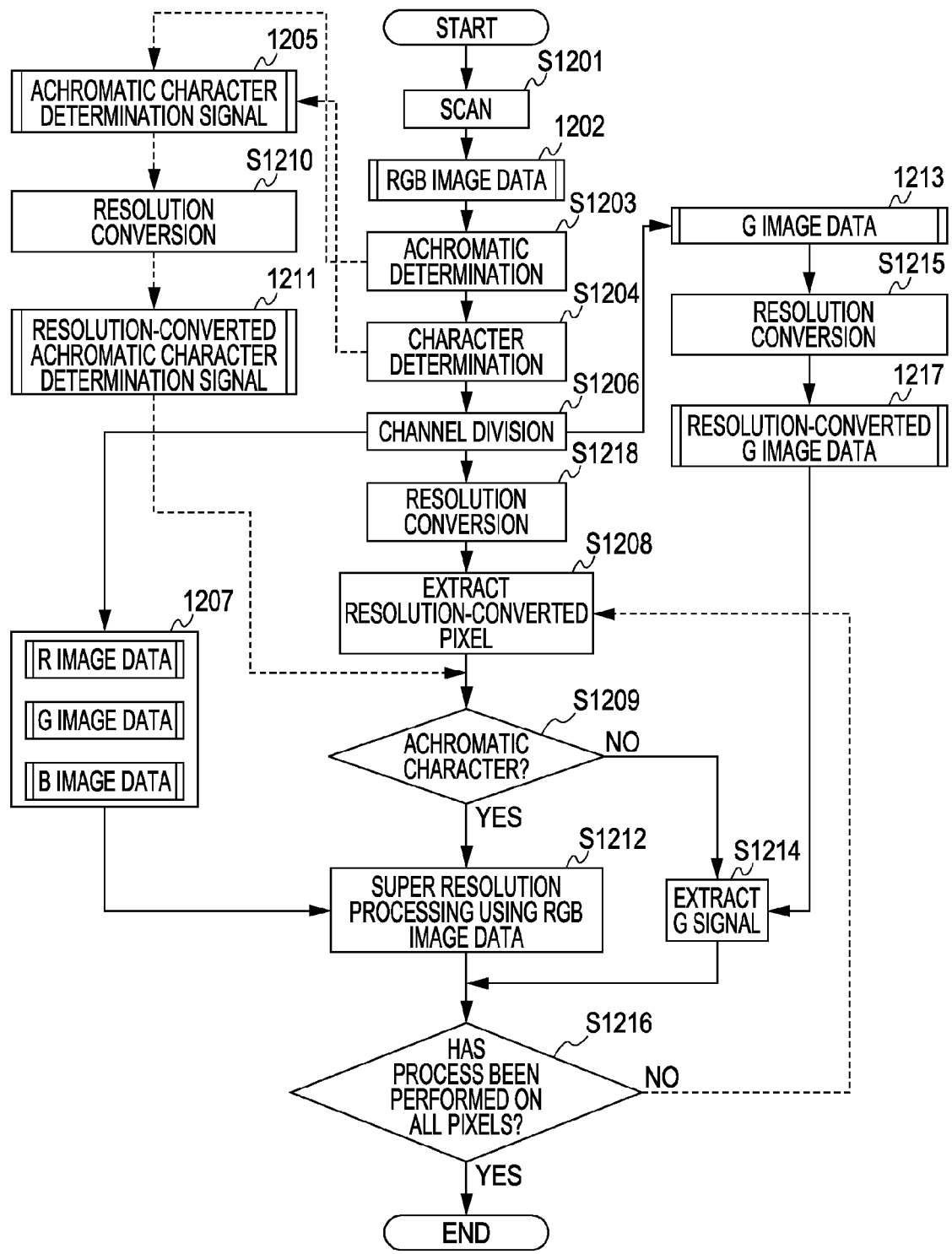
FIG. 12 is a flowchart illustrating a process according to the fourth embodiment.

A process according to this embodiment is illustrated in FIG. 12. As in the preceding embodiments, the fourth embodiment is based on the assumption that scan is performed at resolution of 600 dpi and that image data of 1200 dpi is obtained through super resolution processing. Any other form may alternatively be applied so long as resolution is increased through super resolution processing, as in the first embodiment.

First, in step S1201, scan is performed to obtain RGB image data 1202. In the preceding embodiments, affine transformation is performed since the line sensors are inclined. In this embodiment, however, affine transformation is not performed because the line sensors are not inclined. Step S1203 and the subsequent steps of FIG. 12 are the same as step S705 and the subsequent steps of FIG. 7, and further redundant description thereof is therefore omitted.

In this embodiment, super resolution processing is performed on achromatic characters as in the first embodiment. Alternatively, the processing may be performed on chromatic characters by comparing signal values as in the second and third embodiments. Also, as in the third embodiment, the process of using a piece of frame image data obtained from a specific channel as a reference and the Bk sensor may be added.

According to this embodiment, resolution of specific pixels can be increased when monochrome copy or monochrome transmission is performed in an MFP including a color scanner. Particularly, since the direction is limited to the sub-scanning direction, inclination of the line sensors and a circuit for affine transformation are unnecessary. Accordingly, high-resolution image data can be obtained at a monetary cost almost the same as those of a conventional MFP.

A processing method for storing a program to operate the configurations of the above-described embodiments to realize the function of the above-described embodiments in a storage medium, reading the program stored in the storage medium as code, and executing the program in a computer is included in the scope of the above-described embodiments. Also, the storage medium storing the program and the program itself are included in the above-described embodiments.

Examples of the storage medium include a floppy disk, a hard disk, an optical disc, a magneto-optical disc, a CD-ROM (Compact Disc Read Only Memory), a magnetic tape, a non-volatile memory card, and a ROM (Read Only Memory).

Also, not only execution of a process based on the program stored in the storage medium alone, but also execution of the operation of the above-described embodiments based on the program operating in an OS (Operating System) in cooperation with a function of other software and an expansion board are included in the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-340389 filed Dec. 28, 2007 and Japanese Patent Application No. 2008-320304 filed Dec. 16, 2008, which are hereby incorporated by reference herein in their entirety.

What is claimed is:

1. An image processing apparatus comprising:
   an obtaining unit configured to include a plurality of line sensors for reading respective colors and obtain a plurality of one-colored frames of image data corresponding to each of the plurality of line sensors by reading an original image line by line using the plurality of line sensors;
   a correcting unit configured to correct the plurality of frames of image data so that reading positions of frames of image data obtained by adjacent line sensors among the plurality of frames of image data obtained by the obtaining unit are shifted by less than a pixel in at least one of a main scanning direction and a sub-scanning direction; and
   a high-resolution converting unit configured to perform interpolation by using the plurality of frames of image data having different colors corrected by the correcting unit so as to obtain monochrome image data having resolution higher than resolution of the line sensors.

2. The image processing apparatus according to claim 1, wherein the plurality of line sensors for obtaining image data of different colors are a line sensor having a red color filter, a line sensor having a green color filter, and a line sensor having a blue color filter.

3. The image processing apparatus according to claim 1, wherein the plurality of line sensors for obtaining image data of different colors are a line sensor having a red color filter, a line sensor having a green color filter, a line sensor having a blue color filter, and a line sensor having no color filter.

4. The image processing apparatus according to claim 1, wherein the correcting unit is an offset correcting unit, compensates for shifts of a pixel or more of the reading positions on the original image, the shifts being caused in the sub-scanning direction due to intervals of positions where the plurality of line sensors are placed, and outputs the plurality of frames of image data in which the reading positions on the original image are shifted by less than a pixel in the sub-scanning direction.

5. The image processing apparatus according to claim 1, wherein the plurality of line sensors are placed with inclination with respect to a reference position, and wherein the correcting unit is an angle correcting unit and performs correction to compensate for the inclination by rotating the frames of image data.

6. The image processing apparatus according to claim 1, further comprising:
   a signal value obtaining unit configured to obtain signal values of the frames of image data obtained by the plurality of line sensors,
   wherein high-resolution conversion is performed on an area where the signal value obtaining unit determines that there are two or more frames of image data having similar signal values.

7. The image processing apparatus according to claim 6, wherein the high-resolution conversion is performed on an area where the signal value obtaining unit determines that signal values of all the frames of image data are similar.

8. The image processing apparatus according to claim 6, wherein the high-resolution conversion is performed on a character portion in an area where the signal value obtaining unit determines that signal values of all the frames of image data are similar.

9. The image processing apparatus according to claim 1, further comprising:
   a reference image data selecting unit configured to select reference image data from the image data obtained by the plurality of line sensors,
   wherein high-resolution conversion is performed on an area where it is determined that there is image data having a signal value similar to a signal value of the reference image data.

10. The image processing apparatus according to claim 9, wherein the reference image data is image data obtained by a line sensor having no color filter.

11. An image processing method in an image processing apparatus including a sensor unit configured to include plurality of line sensors for reading respective colors, the image processing method comprising:
    obtaining a plurality of one-colored frames of image data corresponding to each of the plurality of line sensors by reading an original image line by line using the plurality of line sensors;
    correcting the plurality of image data so that reading positions of frames of image data obtained by adjacent line sensors among the plurality of frames of image data obtained by the obtaining unit are shifted by less than a pixel in at least one of a main scanning direction and a sub-scanning direction; and
    performing interpolation using the plurality of frames of image data of different colors corrected in the correcting so as to obtain monochrome image data having resolution higher than resolution of the line sensors.

12. The image processing method according to claim 11, wherein the plurality of line sensors for obtaining image data of different colors are a line sensor having a red color filter, a line sensor having a green color filter, and a line sensor having a blue color filter.

13. The image processing method according to claim 11, wherein the plurality of line sensors for obtaining image data of different colors are a line sensor having a red color filter, a line sensor having a green color filter, a line sensor having a blue color filter, and a line sensor having no color filter.

14. The image processing method according to claim 11, wherein the correcting performs offset correction on the image data, compensates for shifts of a pixel or more of the reading positions on the original image, the shifts being caused in the sub-scanning direction due to intervals of positions where the plurality of line sensors are placed, and outputs the plurality of frames of image data in which the reading positions on the original image are shifted by less than a pixel in the sub-scanning direction.

15. The image processing method according to claim 11, wherein the plurality of line sensors are placed with inclination with respect to a reference position, and wherein the correcting performs angle correction and performs correction to compensate for the inclination by rotating the frames of image data.

16. The image processing method according to claim 11, further comprising:
obtaining signal values of the frames of image data obtained by the plurality of line sensors,
wherein high-resolution conversion is performed on an area where said obtaining signal values determines that there are two or more frames of image data having similar signal values.

17. The image processing method according to claim 16, wherein the high-resolution conversion is performed on an area where said obtaining signal values determines that signal values of all the frames of image data are similar.

18. The image processing method according to claim 16, wherein the high-resolution conversion is performed on a character portion in an area where said obtaining signal values determines that signal values of all the frames of image data are similar.

19. The image processing method according to claim 11, further comprising:
selecting reference image data from the image data obtained by the plurality of line sensors,
wherein the high-resolution conversion is performed on an area where it is determined that there is image data having a signal value similar to a signal value of the reference image data.

20. The image processing method according to claim 19, wherein the reference image data is image data obtained by a line sensor having no color filter.

21. An image processing apparatus comprising:
an obtaining unit configured to include a plurality of line sensors for reading respective colors, each of the plurality of line sensors having a reading position shifted less than a pixel from adjacent line sensors, and obtain a plurality of one-colored frames of image data corresponding to each of the plurality of line sensors by reading the original image line by line using the plurality of line sensors; and
a high-resolution converting unit configured to perform interpolation by using the plurality of frames of image data of different colors obtained by the obtaining unit so as to obtain monochrome image data having resolution higher than resolution of the line sensors.

22. An image processing method in an image processing apparatus comprising a plurality of line sensors for reading respective colors, each of the plurality of line sensors having a reading position shifted less than a pixel from adjacent line sensors, and obtaining a plurality of on-colored frames of image data corresponding to each of the plurality of line sensors by reading the original image line by line using the plurality of line sensors, the image processing method performing interpolation using the plurality of frames of image data of different colors obtained by the plurality of line sensors to obtain monochrome image data having resolution higher than resolution of the line sensors.

23. A non-transitory medium readable by a computer, the non-transitory medium carrying a program of instructions capable of causing the computer to perform the method of claim 11.

* * * * *